(12) United States Patent
Fowler et al.

(10) Patent No.: US 12,085,323 B2
(45) Date of Patent: Sep. 10, 2024

(54) TEMPERATURE-CONTROLLED SORPTION SYSTEM

(71) Applicant: Gobi Technologies Inc., Kirkland, WA (US)

(72) Inventors: Lawrence Morgan Fowler, Kirkland, WA (US); Peter Maier-Laxhuber, Pfaffenhofen an der Ilm (DE); Ralf Schmidt, Freising (DE); William Randal Sims, Nashville, TN (US)

(73) Assignee: Gobi Technologies Inc., Kirkland, WA (US)

( * ) Notice: Subject to any disclaimer, the term of this patent is extended or adjusted under 35 U.S.C. 154(b) by 0 days.

(21) Appl. No.: 18/220,745

(22) Filed: Jul. 11, 2023

(65) Prior Publication Data
US 2023/0417467 A1 Dec. 28, 2023

Related U.S. Application Data

(63) Continuation of application No. 17/404,731, filed on Aug. 17, 2021, now Pat. No. 11,747,066, which is a
(Continued)

(51) Int. Cl.
*F25B 49/04* (2006.01)
*F25B 30/04* (2006.01)
(Continued)

(52) U.S. Cl.
CPC ............ *F25B 49/04* (2013.01); *F25B 30/04* (2013.01); *F25B 39/026* (2013.01); *F25B 41/28* (2021.01);
(Continued)

(58) Field of Classification Search
CPC ........ F25B 49/04; F25B 30/04; F25B 39/026; F25B 41/28; F25B 2400/01;
(Continued)

(56) References Cited

U.S. PATENT DOCUMENTS 2,293,556 A * 8/1942 Newton ............... F25B 49/046
62/480
5,038,581 A 8/1991 Maier-Laxhuber et al.
(Continued)

FOREIGN PATENT DOCUMENTS

EP 2978683 A1 2/2016
JP 2004233039 A 8/2004
(Continued)

OTHER PUBLICATIONS

U.S. Appl. No. 16/888,483, filed May 29, 2020.
(Continued)

*Primary Examiner* — Steve S Tanenbaum
(74) *Attorney, Agent, or Firm* — Davis Wright Tremaine, LLP; George R. Rondeau, Jr.

(57) ABSTRACT

A temperature controller for a sorption system having an evaporator to produce a gas, a sorber containing a sorption material to sorb the gas during a sorption phase, a flow channel extending between the evaporator and sorber to provide a gas pathway connecting them, a valve to control the rate of gas flow in the flow channel, and a temperature sensor positioned to measure the temperature of an evaporator surface or the air adjacent thereto indicative of an evaporator surface temperature, and generate a temperature signal. The controller includes an inflatable member having first and second inflation states, and a control unit configured to evaluate the temperature signal and in response control the state of inflation of the inflatable member and thereby the operation of the valve to control the rate of gas flow between the evaporator and sorber through the gas pathway.

40 Claims, 24 Drawing Sheets

Related U.S. Application Data continuation of application No. 17/330,165, filed on May 25, 2021, now abandoned, which is a continuation-in-part of application No. 16/888,483, filed on May 29, 2020, now Pat. No. 11,732,935.

(60) Provisional application No. 62/936,942, filed on Nov. 18, 2019, provisional application No. 62/855,626, filed on May 31, 2019.

(51) Int. Cl.
  *F25B 39/02* (2006.01)
  *F25B 41/28* (2021.01)

(52) U.S. Cl.
  CPC ... *F25B 2400/01* (2013.01); *F25B 2600/2515* (2013.01); *F25B 2700/19* (2013.01); *F25B 2700/2117* (2013.01)

(58) Field of Classification Search
  CPC .......... F25B 2600/2515; F25B 2700/19; F25B 2700/2117
  USPC ......................................................... 62/141
  See application file for complete search history.

(56) References Cited

U.S. PATENT DOCUMENTS

| | | |
|---|---|---|
| 5,050,403 A | 9/1991 | Maier-Laxhuber |
| 5,054,544 A | 10/1991 | Maier-Laxhuber et al. |
| 5,059,567 A | 10/1991 | Linsten et al. |
| 5,197,712 A | 3/1993 | Engelhardt |
| 5,207,073 A | 5/1993 | Maier-Laxhuber et al. |
| 5,291,942 A | 3/1994 | Ryan |
| 5,359,861 A | 11/1994 | Maier-Laxhuber et al. |
| 5,404,728 A | 4/1995 | Maier-Laxhuber |
| 5,415,012 A | 5/1995 | Maier-Laxhuber et al. |
| 5,482,541 A | 1/1996 | Maier-Laxhuber et al. |
| 5,494,410 A | 2/1996 | Maier-Laxhuber et al. |
| 5,518,069 A * | 5/1996 | Maier-Laxhuber ..... F25B 17/08 62/480 |
| 5,585,145 A | 12/1996 | Maier-Laxhuber et al. |
| 5,675,982 A | 10/1997 | Kirol et al. |
| 6,349,560 B1 | 2/2002 | Maier-Laxhuber et al. |
| 6,378,326 B2 | 4/2002 | Maier-Laxhuber et al. |
| 6,412,295 B2 | 7/2002 | Weiss et al. |
| 6,474,100 B1 | 11/2002 | Smith et al. |
| 6,623,648 B2 | 9/2003 | Lee |
| 6,820,441 B2 | 11/2004 | Maier-Laxhuber et al. |
| 7,213,403 B2 | 5/2007 | Maier-Laxhuber et al. |
| 7,213,411 B2 | 5/2007 | Maier-Laxhuber et al. |
| 7,726,139 B2 | 6/2010 | Maier-Laxhuber |
| 8,074,470 B2 | 12/2011 | Maier-Laxhuber et al. |
| 9,140,476 B2 | 9/2015 | Eckhoff et al. |
| 9,170,053 B2 | 10/2015 | Eckhoff et al. |
| 9,657,982 B2 | 5/2017 | Chou et al. |
| 9,902,977 B2 | 2/2018 | Lim et al. |
| 10,203,137 B2 | 2/2019 | Burk |
| 2004/0211215 A1 | 10/2004 | Maier-Laxhuber et al. |
| 2004/0231346 A1 | 11/2004 | Smith et al. |
| 2006/0191287 A1 | 8/2006 | Maier-Laxhuber |
| 2008/0276486 A1 | 11/2008 | Eichholz et al. |
| 2008/0314070 A1 | 12/2008 | Maier-Laxhuber et al. |
| 2009/0222220 A1* | 9/2009 | Wilke ................. F16K 37/0091 702/41 |
| 2012/0000220 A1 | 1/2012 | Altay |
| 2013/0276475 A1 | 10/2013 | Aso et al. |
| 2013/0306656 A1 | 11/2013 | Eckhoff et al. |
| 2014/0290293 A1 | 10/2014 | Eckhoff et al. |
| 2015/0027157 A1 | 1/2015 | Chou et al. |
| 2016/0084577 A1 | 3/2016 | Chou et al. |
| 2017/0198960 A1 | 7/2017 | Chou et al. |
| 2019/0170418 A1 | 6/2019 | Barot et al. |
| 2020/0378656 A1 | 12/2020 | Fowler et al. |

FOREIGN PATENT DOCUMENTS

| | | |
|---|---|---|
| JP | 2008215808 A | 9/2008 |
| JP | 2009002642 A | 1/2009 |
| JP | 2015183931 A | 10/2015 |
| JP | 2016514824 A | 5/2016 |
| JP | 2016516973 A | 6/2016 |
| JP | 2018531357 A | 10/2018 |
| WO | 2013153517 A2 | 10/2013 |
| WO | 2014160833 A1 | 10/2014 |

OTHER PUBLICATIONS

U.S. Appl. No. 17/404,731, filed Aug. 17, 2021.
U.S. Appl. No. 18/213,510, filed Jun. 23, 2023.
International Search Report and Written Opinion for Application No. PCT/US2021/034094, mailed Sep. 14, 2021, filed May 25, 2021, 9 pages.
Partial European Search Report for Application No. 20813098.9, mailed Dec. 5, 2022, 13 pages.
Extended European Search Report for Application No. 20813098.9, mailed Mar. 10, 2023, 10 pages.

\* cited by examiner

TEMPERATURE-CONTROLLED SORPTION SYSTEM

CROSS REFERENCE TO RELATED APPLICATIONS

This application is a continuation of U.S. Nonprovisional patent application Ser. No. 17/404,731, filed Aug. 17, 2021, and is a Continuation of U.S. Nonprovisional patent application Ser. No. 17/330,165, filed May 25, 2021, and is a Continuation-in-Part of U.S. Nonprovisional patent application Ser. No. 16/888,483, filed May 29, 2020, which claims the benefit of U.S. Provisional Patent Application No. 62/936,942 filed Nov. 18, 2019, and U.S. Provisional Patent Application No. 62/855,626 filed May 31, 2019, the disclosures of which are hereby incorporated herein in their entirety.

BACKGROUND OF THE INVENTION

Field of the Invention

The present invention relates to a temperature control for sorption systems.

Description of the Related Art

Sorption systems based on the sorption principle are described, for example, in the U.S. patent application Ser. No. 16/888,483 (U.S. Publication 2020-0378656), filed on May 29, 2020, which is incorporated herein by reference in its entirety.

A sorption system is a device that raises heat from a lower temperature level to a higher temperature level by vaporizing a working fluid in an evaporator and sorbing it in a sorbent container that contains a sorbent. The evaporator and the sorbent container are connected to one another by a steam channel. The evaporation of the liquid working medium to a vapor working medium in the evaporator requires heat. If not enough heat flows in, the evaporator cools down. The sorption of the working medium in the sorbent container in turn releases heat. This heat has to be dissipated. One use of a sorption system is as a sorption cooling system.

In order to keep the evaporation temperature at the required temperature level, the flow of the working fluid vapor through the steam channel must be regulated by means of a valve. The evaporator is housed in an insulated transport box while the sorbent container located outside the transport box can dissipate its sorption heat to the environment.

In sorption cooling systems, effective and reliable control of the valve flow rate is difficult, especially when the control has to work reliably for many days. Sorption cooling systems are increasingly being used for shipping temperature-sensitive goods, including medicines. The temperature of the transported goods must be in a very narrow temperature range, e.g. +2 to +8° C. The ambient temperatures occurring during transport can naturally fluctuate rapidly and strongly. For example, when transporting certain vaccines, the vaccine storage space temperature may only fluctuate between +2° C. and +8° C. The external temperatures can be between −25° C. and +43° C. The transport time can be more than 6 days. The power consumption of the temperature control must be minimized over long transport times and preferably also during the previous storage times.

When transporting sorption cooling systems, strong vibrations and falls from high heights can occur. If sorption systems are used for temperature-controlled transport, the manufacturing and operating costs must be particularly low. It often happens that the cooling system can only be used for a single transport route. For logistical reasons, it is often not possible or useful to return the transport used to the originating source.

BRIEF DESCRIPTION OF THE SEVERAL VIEWS OF THE DRAWING(S)

DETAILED DESCRIPTION OF THE INVENTION

The temperature controller of the present invention preferably provides a reusable temperature control for sorption systems that work in a vacuum. Preferably, the temperature controller can actuate a valve that is located in a separate vacuum system. The pre-selectable evaporation temperature of the sorption system should be adhered to. Preferably, it is possible to connect the temperature controller to exchangeable sorption systems with simple means. Preferably, the temperature controller should be reusable. Preferably, the temperature controller should be removable from the sorption systems with which used without use of tools and be just as easy to reconnect to a fresh sorption system without the use of tools.

Figure 1:
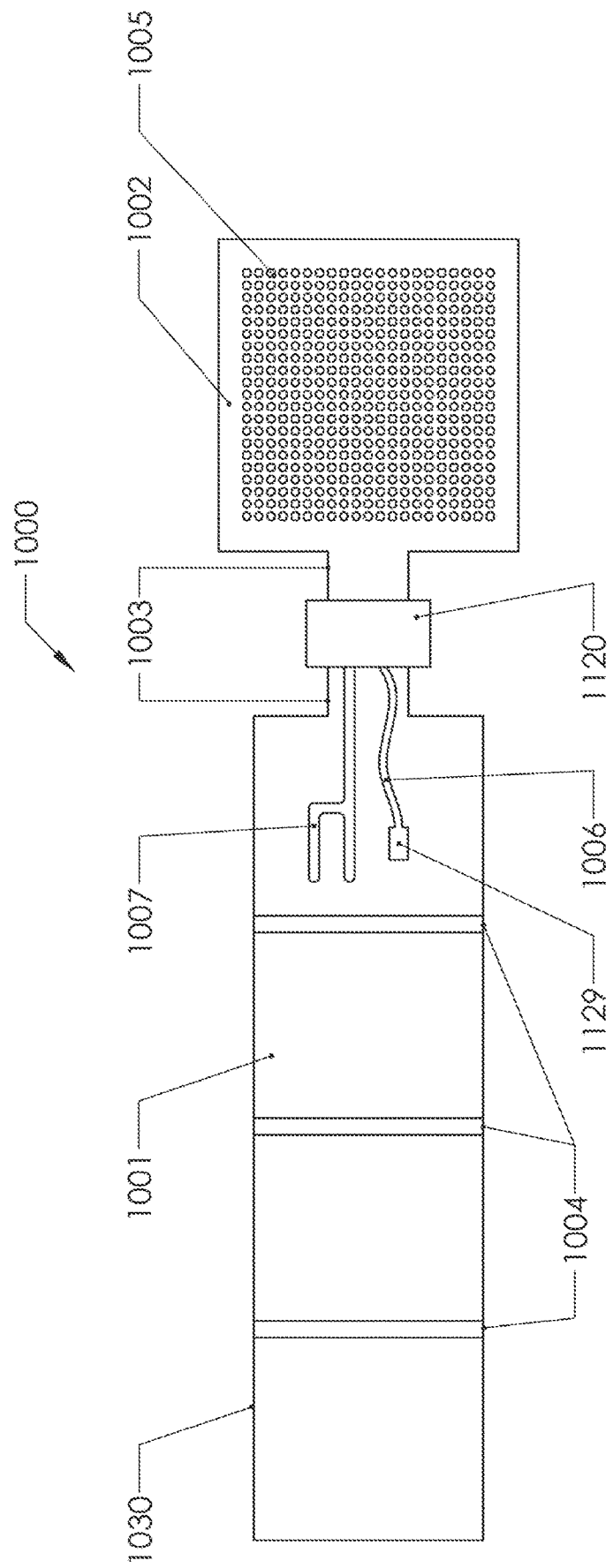
FIG. 1 is a schematic drawing of a sorption system in accordance with the present invention.
Figure 2:
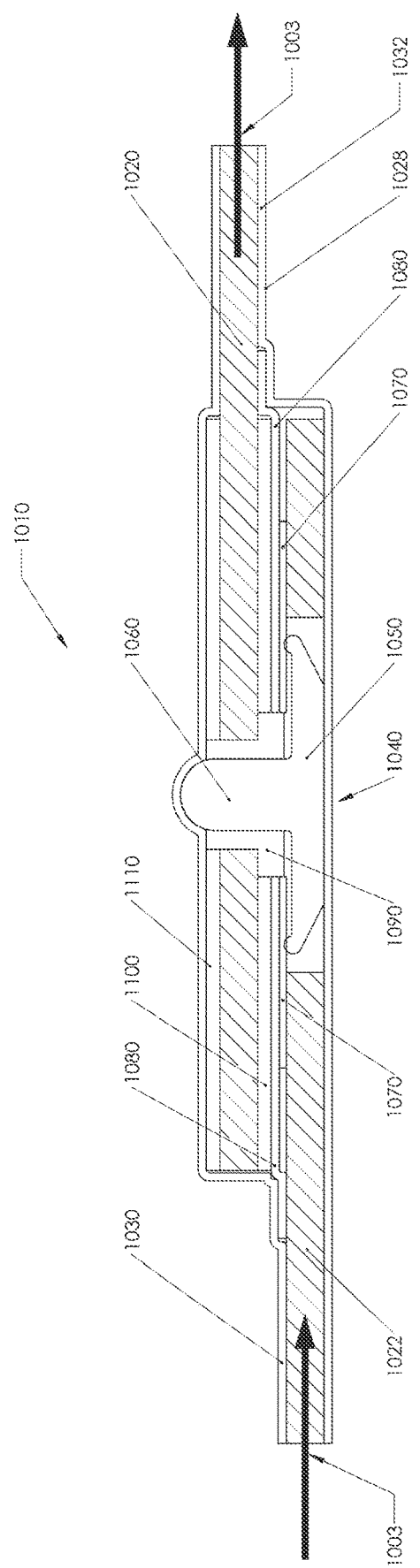
FIG. 2 is a schematic cross sectional view of a valve for use with the sorption system of FIG. 1 showing the valve in a closed position.

A sorption system 1000 using a battery-operated temperature controller 1120 in accordance with the present invention is shown in FIG. 1. The sorption system 1000 includes an evaporator 1001 in which a liquid working medium is absorbed in a fleece (not shown). As shown in FIG. 2, the evaporator 1001 has a flexible, vacuum-tight outer shell 1028 made of an upper flexible film 1030 and a lower flexible film 1032, which are sealed in a gas-tight manner at their adjoining seams by known sealing methods. The fleece is divided into four sections. The evaporator 1001 can be bent at contact lines 1004 of the sub-areas of the evaporator in order for it to be inserted precisely into an insulated transport box or payload compartment (not shown). An electrical heating circuit 1007 may be inserted into the interior of the insulated transport box. The heating circuit 1007 is used to heat the interior of the insulated transport box when the ambient temperature within the box is below a required control temperature. A temperature sensor 1129 senses the temperature of the evaporator 1001 surface and/or the air adjacent to the evaporator surface indicative of the evaporator surface temperature, and generates a temperature signal, and reports the temperature to the temperature controller 1120 via a communication channel 1006, which may be a wire or a wireless signal. In response to a sensed temperature being below the control temperature, the temperature controller 1120 takes over the control and regulation of the heating circuit 1007. The temperature sensor may or may not form a portion of the temperature controller.

The evaporator 1001 is connected to a sorbent container 1002 via a steam flow channel 1003. Working medium steam can flow through the steam flow channel 1003 to the sorbent container 1002, provided that an intermediate valve 1010 (shown in FIG. 2) is kept open by the temperature controller 1120. A granulated sorbent 1005 in the sorbent container 1002 may sorb the working medium vapor flowing in. The sorbent 1005 may contain, for example, zeolite, which stores the working medium vapor in its lattice structure. During sorption heat is released. The temperature controller 1120 operates the valve 1010 that is located in the steam flow channel 1003 in response to the temperature measured by the temperature sensor 1129.

As described above, the valve 1010 is arranged between the evaporator 1001 and the sorbent container 1002. The valve 1010 and temperature controller 1120 are shown in greater detail in FIGS. 3 and 4.

Figure 3:
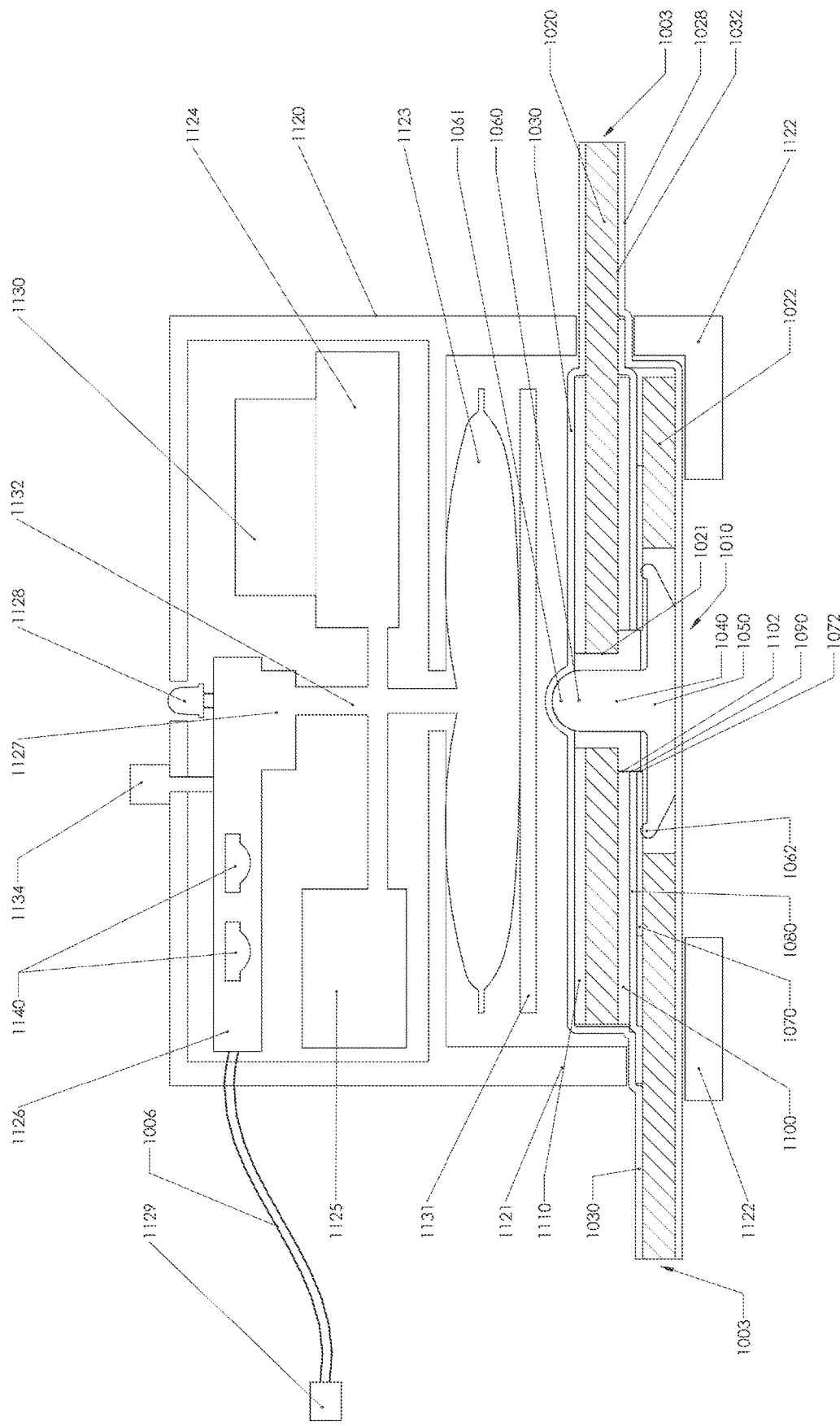
FIG. 3 is a schematic cross sectional view of a temperature controller docked with the valve of FIG. 2, showing the valve in the closed position.
Figure 4:
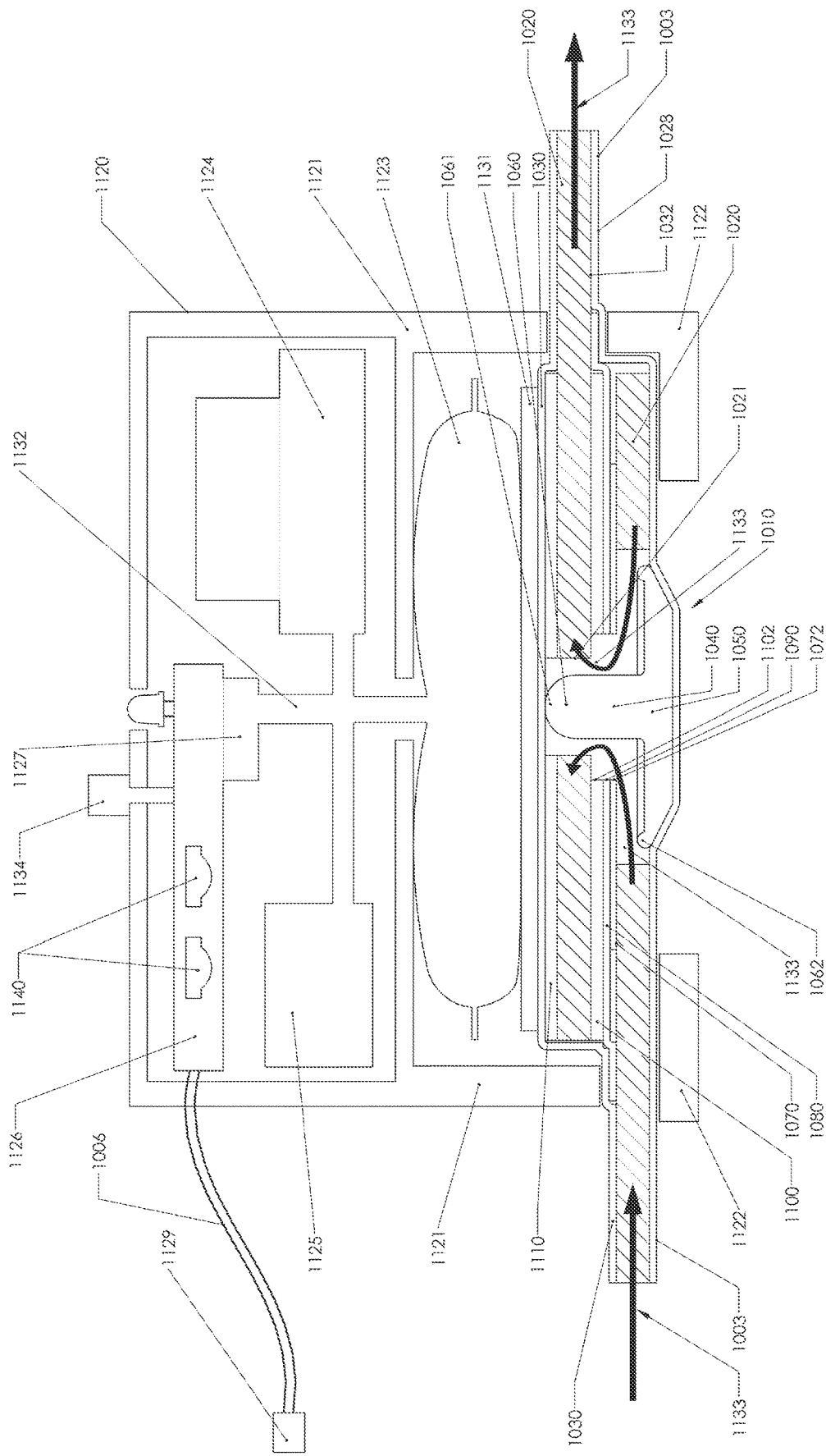
FIG. 4 is a schematic cross sectional view of a temperature controller docked with the valve of FIG. 2, showing the valve in the opened position.

In FIGS. 3 and 4, the temperature controller 1120 is shown removably docked to the valve 1010 using suitable contact surfaces 1121 and 1122 of the temperature controller. The lower contact surfaces 1122 can be designed to be foldable or displaceable relative to the upper contact surfaces 1121 to securely but removably, attach the temperature controller 1120 to the valve 1010 and hence the flow channel 1003 of the sorption system 1000. While securely attached by the contact surfaces 1121 and 1122, the temperature controller 1120 is easily detachable from the valve 1010. This permits the selective separation of the temperature controller 1120 from the remainder of the sorption system 1000 and the reuse with the valve 1010 of a different sorption system unit. While the temperature controller 1120 may only move minimally during operation, nevertheless, it should be possible to detach the temperature controller 1120 quickly and without tools from the valve 1010 and to be able to dock it again just as quickly on a new sorption system. FIG. 2 shows the valve 1010 with the temperature controller 1120 removed. The valve 1010 and the other portions of the sorption system 1000, other than the temperature controller 1120, are usually disposed of as a single-use product after being used or are reprocessed elsewhere, while the temperature controller 1120 may be reused several times with different units of the sorption systems.

FIG. 3 shows the valve 1010 in a closed position with the temperature controller 1120 docked to the valve for use. The temperature controller 1120 includes an inflatable air bladder or pouch 1123, an air compressor 1124 operated by a motor 1130, an air outlet valve 1125 and an electrical control unit 1126, interconnected by an air line system 1132. The control unit 1126 optionally includes a pressure sensor 1127, the temperature sensor 1129, and a signal unit 1128. The control unit 1126 works with the temperature sensor 1129 to control the inflatable pouch 1123. Two exchangeable, electrical batteries 1140 are provided to power the temperature controller 1120. Preferably, the control unit 1126 includes a microcontroller mounted on an electronic circuit board, operatively connected to the temperature sensor 1129 and the air compressor 1124, and configured to read the temperature signal of the temperature sensor. The valve 1010 regulates the working medium vapor flow from the evaporator 1001 to the sorbent container 1002 (see FIG. 1). By opening or closing the valve 1010, the cooling power of the sorption system 1000 is controlled and thus regulates the evaporation temperature. The inflatable pouch 1123 is used to actuate the valve 1010, which is located outside of the temperature controller 1120 and in the flow channel 1003 of the sorption system 1000, and in a separate vacuum system. The temperature controller 1120 is reusable with sorption systems that work in a vacuum. The temperature controller 1120 can precisely adhere to a pre-selected evaporation temperature of the sorption system 1000.

The flow channel 1003 is formed by overlapping, gas-permeable upper and lower spacer grids 1020 and 1022, respectively. The upper and lower spacer grids 1020 and 1022 are enclosed in a gas-tight manner by the upper flexible film 1030 and the lower flexible film 1032 of the vacuum-tight outer shell 1028. In the case of sorption systems that operate under vacuum, the upper and lower flexible films 1030 and 1032 are pressed onto the upper and lower spacer grids 1020 and 1022, respectively, by external air pressure. The vapor of the gaseous working medium flows through the flow-open spacer grids 1020 and 1022.

The valve 1010 includes a mushroom-shaped sealing element 1040 having circular sealing plate 1050 connected to an upwardly extending plunger 1060 with a upper end portion 1061. The sealing plate 1050 has a circumferentially extending and upwardly projecting seal portion 1062 that is pressed into sealing engagement with a lower side of a flat silicone seal 1070 when the valve is in the closed position as shown in FIG. 3. It is noted that the seal 1070 may be made from suitable materials other than silicone. The silicone seal 1070 has a flow opening 1072 through which the plunger 1060 upwardly extends. The upper side of the silicone seal 1070 is in turn pressed onto a middle flexible film 1080, which contains a flow opening 1090 aligned with the opening 1072 of the silicone seal 1070, and through which the plunger 1060 upwardly extends. The upper spacer grid 1020 also has a flow opening 1021 aligned with the opening 1072 of the silicone seal 1070 and the opening 1090 of the middle flexible film 1080, and through which the plunger 1060 extends.

The outer perimeter portion of the middle flexible film 1080 is sealed with the upper flexible film 1030 in such a way that the flow openings 1072 and 1090 provide the only flow path for the working medium vapor to reach the upper spacer grid 1020. To stiffen the valve 1010, a plastic support plate 1100, which is also perforated, is positioned above the middle flexible film 1080 and coplanar with the silicone seal 1070 and middle flexible film 1080, and has a flow opening 1102 aligned with the opening 1072 of the silicone seal 1070 and the opening 1090 of the middle flexible film 1080, and through which the plunger 1060 extends. Another plastic support plate 1110 is positioned above and coplanar with the upper spacer grid and has an opening 1112 aligned with the opening 1072 of the silicone seal 1070, the opening 1090 of the middle flexible film 1080, the opening 1102 of the support plate 1100, and the opening 1021 of the upper spacer grid 1020, and through which the plunger 1060 extends. The opening 1112 of the plastic support plate 1110 is of a reduced size compared to openings 1072, 1090 and 1102 to facilitate guiding of the plunger 1060 as it moves up and down during operation.

It is noted that the lower flexible film 1032 is positioned below the bottom of the sealing plate 1050. As such, when under a vacuum within the steam flow channel 1003, the lower flexible film 1032 presses upward on the sealing plate. The upper flexible film 1030, on the other hand under such a vacuum, presses downward on the mushroom-shaped upper end portion 1061 of the plunger 1060. The closing force that acts between the silicone seal 1070 and the seal portion 1062 of the sealing plate 1050 is thus proportional to the difference between the respective areas of the sealing plate 1050 and the upper end portion 1061 of the plunger 1060. The effective closing force on the sealing element 1040 may therefore be designed by choosing the geometry of these two portions of the plunger 1060. In the illustrated embodiment, the valve 1010 is designed to normally be in the closed position as shown in FIG. 3.

To open the valve 1010 to the opened position shown in FIG. 4 and open the flow opening 1072 of the silicone seal 1070, the upper end portion 1061 of the plunger 1060 is pushed downward sufficient to move the seal portion 1062 of the sealing plate 1050 downward to a position below and spaced away from the silicone seal and hence out of sealing engagement with the silicone seal 1070. To close the flow opening 1072, only the applied opening force needs to be reduced sufficiently to permit the seal portion 1062 of the sealing plate 1050 to move upward into fluid sealing engagement with the silicon seal 1070. The valve 1010 is therefore always closed when no additional downward force acts on the upper end portion 1061 of the plunger 1060. A force is therefore only required when operating the sorption system 1000. A separate locking of the valve 1010 is not necessary to keep the valve 1010 closed. The locking is maintained by the pressure difference between the vacuum within the steam flow channel 1003 and the external ambient air pressure.

As shown in FIG. 3, the inflatable air pouch 1123 is positioned between a stationary interior upper wall of the temperature controller 1120 and a moveable pressure plate 1131. Preferably, the pressure plate 1131 is a rigid plate. To move the valve 1010 to the opened position shown in FIG. 4 from the closed position shown in FIG. 3, the air compressor 1124 of the temperature controller 1120, in response to a signal from the control unit 1126, pumps air into the line system 1132 until the pressure sensor 1127 responds, or until a preset pressure is reached, or until a prespecified period of time ends. The air pressure supplied by the air compressor 1124 via the line system inflates the air pouch 1123, causing the air pouch to expand and press downward on the moveable pressure plate 1131, which moves the pressure plate downward into downward driving engagement with the upper end portion 1061 of the plunger 1060. The pressure plate 1131 is preferably a torsion-resistant, glass fiber reinforced plate having a relatively large area such that to move the plunger 1060 sufficiently downward to open the valve 1010, the air pressure in the line system 1132 may be kept at less than 300 hPa. A pressure of approximately 250 hPa and an effective plate area of only 20 $cm^2$ results in a force of about 50 N. Since the valve 1010 is fixed in position relative to the temperature controller 1120 by the contact surfaces 1121 and 1122, and cannot evade the pressure, the valve plate 1050 is moved downward and separates from the silicone seal 1070 sufficiently to be out of sealing engagement with the silicone seal and presses the flexible upper flexible film 1030 located above the mushroom-shaped upper end portion 1061 of the plunger 1060 downward, overcoming the upward force being applied to the sealing plate 1050 of the sealing element 1040 of the valve 1010 by the external ambient air pressure. This opens the steam flow channel 1003 and provides a vapor channel indicated by the arrows 1133 in FIG. 4, permitting vapor to flow along the vapor channel from the evaporator 1001 to the sorbent container 1002.

As soon as the control unit 1126 gives a signal to close, the air outlet valve 1125 opens and pressurized air within the pouch 1123 may flow out of the pouch, thus allowing the pouch to contract and remove the downward force being applied to the upper end portion 1061 of the plunger 1060, and allowing the sealing element 1040 to move upward and the valve 1010 to return to the normally closed position shown in FIG. 3.

As discussed above, the inflatable pouch 1123 acts on the sealing element 1040, which is under vacuum. The flexible and inflatable pouch 1123 can exert its force effect even with poorly coordinated contact points. When the pouch 1123 is depressurized, the temperature controller 1120 can easily be docked on the valve 1010 or dedocked.

The control unit 1126 is an electronic controller with logic and circuitry configured to receive data from one or more signal units, such as temperature sensors or pressure sensors, and to output signals to one or more display units, lights such as LEDs, electrical heating circuits, and operable components, such as motor, air compressors, or valves. Preferably, the control unit 1126 activates the electrical heating circuit when the temperature measured by the temperature sensor 1129 falls below a preselected temperature. At least one battery may further be included for powering the temperature controller 1120 and the display units, preferably with the control unit indicating the state of the at least one battery using the display. The control unit 1126 can optionally includes memory for data storage and retrieval, with the microcontroller operatively connected to the memory. The memory can be integrated into the control unit 1126 or separate from the control unit 1126. The memory can be, for example, flash memory or random-access memory. The control unit is powered by an energy source, such as the batteries 1140.

A temperature field or preset temperature setpoint can be stored in the control unit 1126, preferably in the memory, with which the temperature just measured at the temperature sensor 1129 is compared. If the measured value is above the temperature setpoint, the pouch 1123 will inflate; if the measured value is below the temperature setpoint, the air outlet valve 1125 will be opened. If, on the other hand, the measured value lies within the temperature setpoint, neither the air compressor 1124 nor the air outlet valve 1125 is addressed. The temperature setpoint can advantageously be set such that it allows the temperatures on the surface of the evaporator 1001 to fluctuate 1 degree Kelvin, between 5.5° C. and 6.5° C., for example. Preferably, the control unit 1126 controls the state of inflation of the inflatable member to regulate the evaporation temperature in the evaporator 1001 to maintain the temperature measured by the temperature sensor 1129 at plus or minus 1 degree Kelvin of the preselected temperature. The interior temperature of the insulated transport box within which the evaporator 1001 is housed is then always within the required temperature range of +2 to +8° C.

The control unit 1126 is powered by the batteries 1140. The state of charge of the batteries can be displayed via the signal unit 1128 at the time the sorption system 1000 is put into operation and/or during the operating time. In particular, when starting the sorption process, the user can check the state of charge and replace the batteries 1140, if necessary. The current interior temperature can also be displayed during transport by means of coded flashing. The signal unit 1128 may be a light that flashes or it may be a display screen.

Advantageously, the control unit 1126 can not only control the air compressor 1124 and the air outlet valve 1125, but can also regulate the separate heating circuit 1007. If the temperature at the temperature sensor 1129 falls below a preset value, the electrical heating circuit 1007 is activated and the interior of the transport box is heated. This is particularly useful if, with very cold outside temperatures, the inside temperature would also drop below the required lower temperature limit of, for example, +2° C.

Advantageously, the control unit 1126 can also store the values measured by the temperature sensor 1129 during operation for later use. An electronic data memory integrated on the control unit 1126 can then output the values when the transport history is evaluated.

The pressure in the pouch 1123 can advantageously also be released manually. To this end, for example, the circuit to the air outlet valve 1125 can be opened manually using a button 1134. This may be important if, before the temperature controller 1120 is docked with a new sorption system, there is still pressure in the line system 1132 from the previous transport. Sufficient residual pressure may prevent the temperature controller 1120 from being pushed over the protruding plunger 1060.

The pressure sensor 1127 of the control unit 1126 measures the pressure in the air line system 1132. The pressure sensor 1127 makes it possible to readjust the pressure in the inflatable pouch 1123 even with slightly leaky lines or components. The air compressor 1124 then needs only run for a few moments until the pressure is built up again. The pressure sensor 1127 can also be used to open and close the valve 1010 in smaller step sequences. The valve 1010 can then function as a control valve and not be limited to only the states of being completely open and completely closed. The operating times of the compressor 1124 and the outlet valve 1125 can then be reduced considerably. This is particularly valuable if the temperature controller 1120 is intended for mobile use and the energy supply via batteries 1140 is limited.

The pressure sensor 1127 is preferably positioned to measure the air pressure in at least one of the pneumatic conduits and generate a pressure signal, and the control unit's microcontroller is operatively connected to the pressure sensor and configured to read the pressure signal of the pressure sensor, and when the air compressor 1124 is inflating the inflatable pouch 1123, if the pressure signal indicates the pressure in the at least one pneumatic conduit reaches a first stored pressure setpoint the microcontroller terminates inflation of the inflatable pouch by the air compressor, and when the air outlet valve is deflating the inflatable pouch, if the pressure signal indicates a pressure in the at least one pneumatic conduit reaches a second stored pressure setpoint the microcontroller terminates deflation of the inflatable pouch by the air outlet valve 1125.

Preferably, when the temperature measured by the temperature sensor 1129 exceeds a stored temperature setpoint, the control unit 1126 causes inflation of the inflatable member to the first inflation state to open the valve 1010, and when the temperature measured by the temperature sensor is below the stored temperature setpoint, the control unit causes deflation of the inflatable member to the second inflation state to close the valve 1010.

As described in U.S. nonprovisional patent application Ser. No. 16/888,483, one example of a thermal regulation system is a sorption heat pump. The sorption heat pump is a device that moves heat from one place to another by vaporizing a working material, also known as a working fluid, in one location (the evaporator) and sorbing the working material to a sorption material in a different location (the sorber). The evaporator and the sorber are connected by a vapor pathway. The evaporation of the working fluid into a working fluid gas in the evaporator requires the input of heat energy, thereby cooling the evaporator. The sorption of the working material in the sorber releases heat energy, thereby heating the sorber.

As further described in U.S. nonprovisional patent application Ser. No. 16/888,483, one embodiment of the invention is a system capable of maintaining a regulated temperature or heat transfer rate using a sorption heat pump system, and in some embodiments, a phase change material (PCM) buffer. In some embodiments, the sorption heat pump system can have a valve to control the vapor flow in which the valve is independent of temperature (for example, an on/off switch). In some embodiments, the sorption heat pump system can have a thermostat to control vapor flow, in which the thermostat controls vapor flow in response to temperature.

Figure 5:
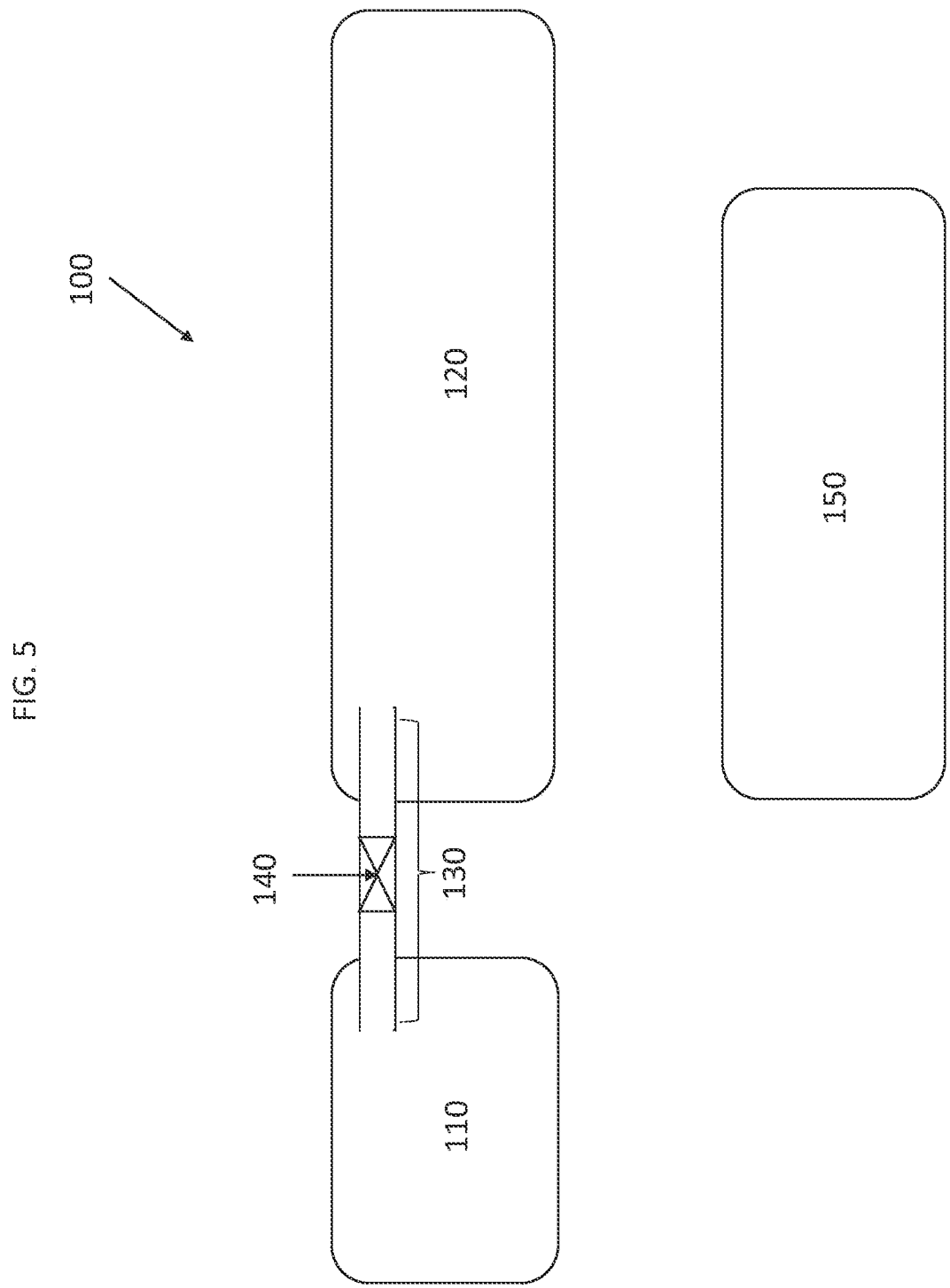
FIG. 5 is a schematic drawing of a sorption heat pump system and a phase change material buffer.

As noted above, the sorption heat pump system 100 shown in FIG. 5 is a device that moves heat from one place to another by vaporizing a working material in one location (an evaporator 120) and sorbing the working material to a sorption material in a different location (a sorber 110). The evaporator 120 and the sorber 110 are connected by a vapor pathway 130. The evaporation of the working material in the evaporator 120 requires the input of heat energy, thereby cooling the evaporator. The sorption of the working material in the sorber 110 releases heat energy, thereby heating the sorber. There are many working material/sorber pairs known. For example, an especially effective pair of materials is water as the working material and zeolite as the sorption material. With this water/zeolite pair, cooling and heating rates in excess of 100 Watts can be achieved by evacuating the air out of the sorption heat pump to a pressure level of less than 10 mbar, for example. The water then evaporates in the evaporator 120 at lower temperatures due to the lower pressure and the sorber 110 sorbs the water vapor. The precise evaporation temperature of the water in the evaporator 120 can be controlled by controlling the pressure in the evaporator 120. The pressure can be controlled by means of a thermal control unit 140 (e.g., a valve or thermostat) between the evaporator 120 and the sorber 110 which controls the rate of vapor flow between the evaporator and the sorber. Likewise, the temperature in the sorber can be controlled by controlling the rate of vapor flow into the sorber by means of the thermal control unit 140. In this way, the rate of heat transfer from one side to another can be started, stopped and controlled. For example, the thermal control unit 140 can control the temperature of the sorber by a thermostat. For example, the thermal control unit 140 can control the temperature of the sorber in a manner that is independent of temperature, such as with an on/off valve.

In some embodiments, the sorption heat pump system is reversible, or "chargeable." This means that the working material can be desorbed from the sorption material, typically by heating the sorption material. The heating of the sorption material can be accomplished in many ways, for example, through the sorber being placed in an oven or toaster-like appliance. Another type of heater is a built-in heating system that heats the sorber 110 from the inside. The working material then desorbs from the sorption material and condenses in the evaporator, or in a compartment between the sorber and the evaporator. The sorption heat pump may then be used again. The sorption heat pump system can be "charged" and then stored with no energy input needed before being used as a heat transfer system at a later time.

The sorption heat pump system can be composed of any number of evaporator sections and sorber sections. In some embodiments, the sorption heat pump system 100 is composed of two sections: the evaporator 120 and the sorber 110. These two sections can be joined by the vapor pathway 130 through which heat is transferred by a vapor. The vapor pathway can have a thermal control unit 140 such as a valve or other vapor control mechanism that can be opened or closed variably to allow vapor to flow through or to slow or halt the flow of vapor. When the valve is open, the vapor evaporates in the evaporator 120 and is adsorbed or absorbed in the sorber 110, thereby transferring heat from the evaporator section to the sorber section.

A phase change material, known as PCM, is a material that changes phase at a specific temperature or temperature range. One example of a basic phase change material is water, which changes from a liquid to a solid at 0 degrees Celsius ("° C."). Other types of phase change materials exist that change phase at various temperatures, for example 5° C. or 80° C. A key property of the PCM is that the material has a significant amount of latent heat at the phase change temperature. This means that the PCM can act as a thermal battery or buffer and release or absorb heat at its phase change temperature. The PCM can thereby serve as a thermal buffer between two or more areas of different temperatures.

Figure 18:
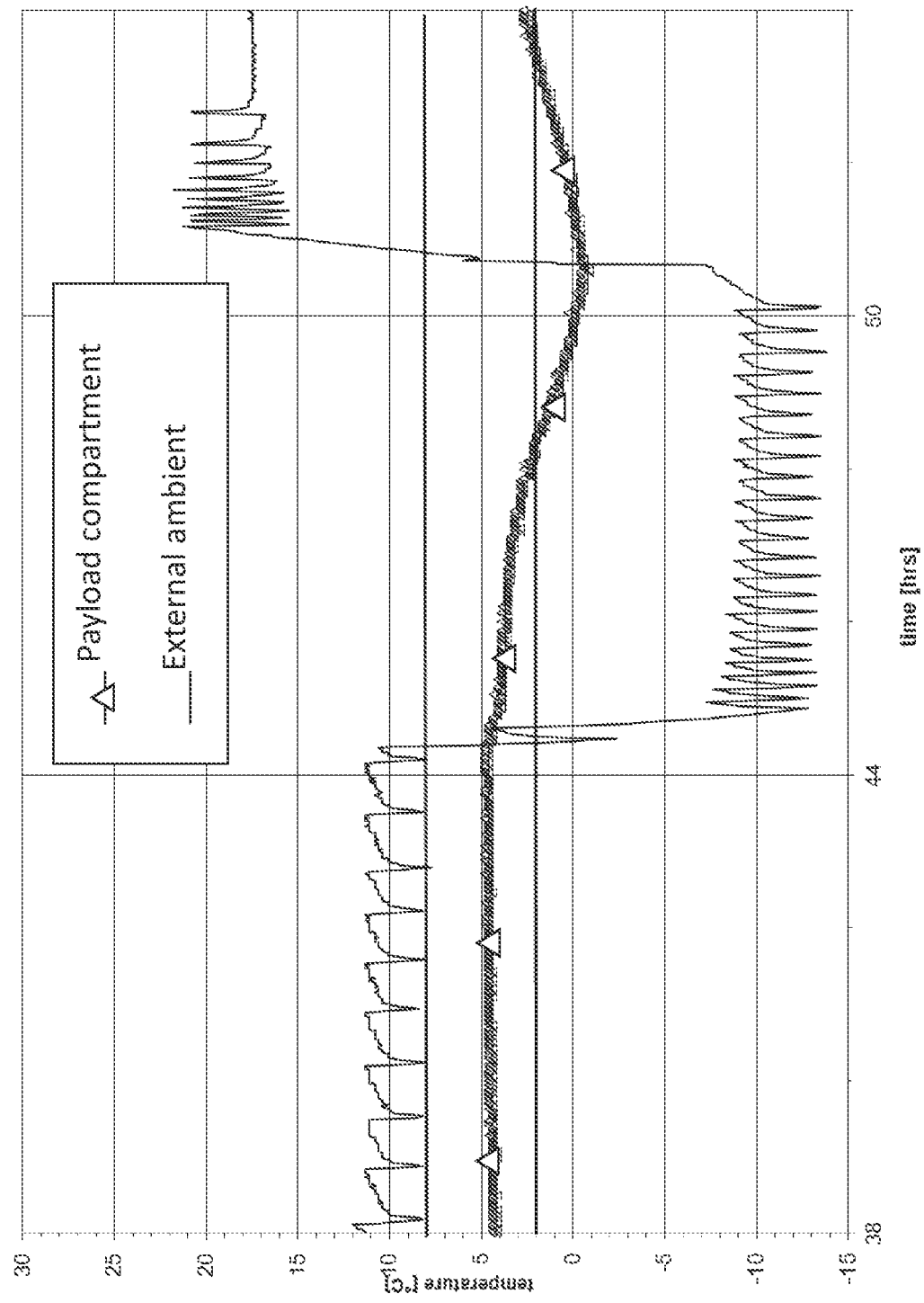
FIG. 18 is a graph of thermal performance of a first example temperature-controlled container using a sorption heat pump, phase change material buffers and a heat pipe heater.
Figure 19:
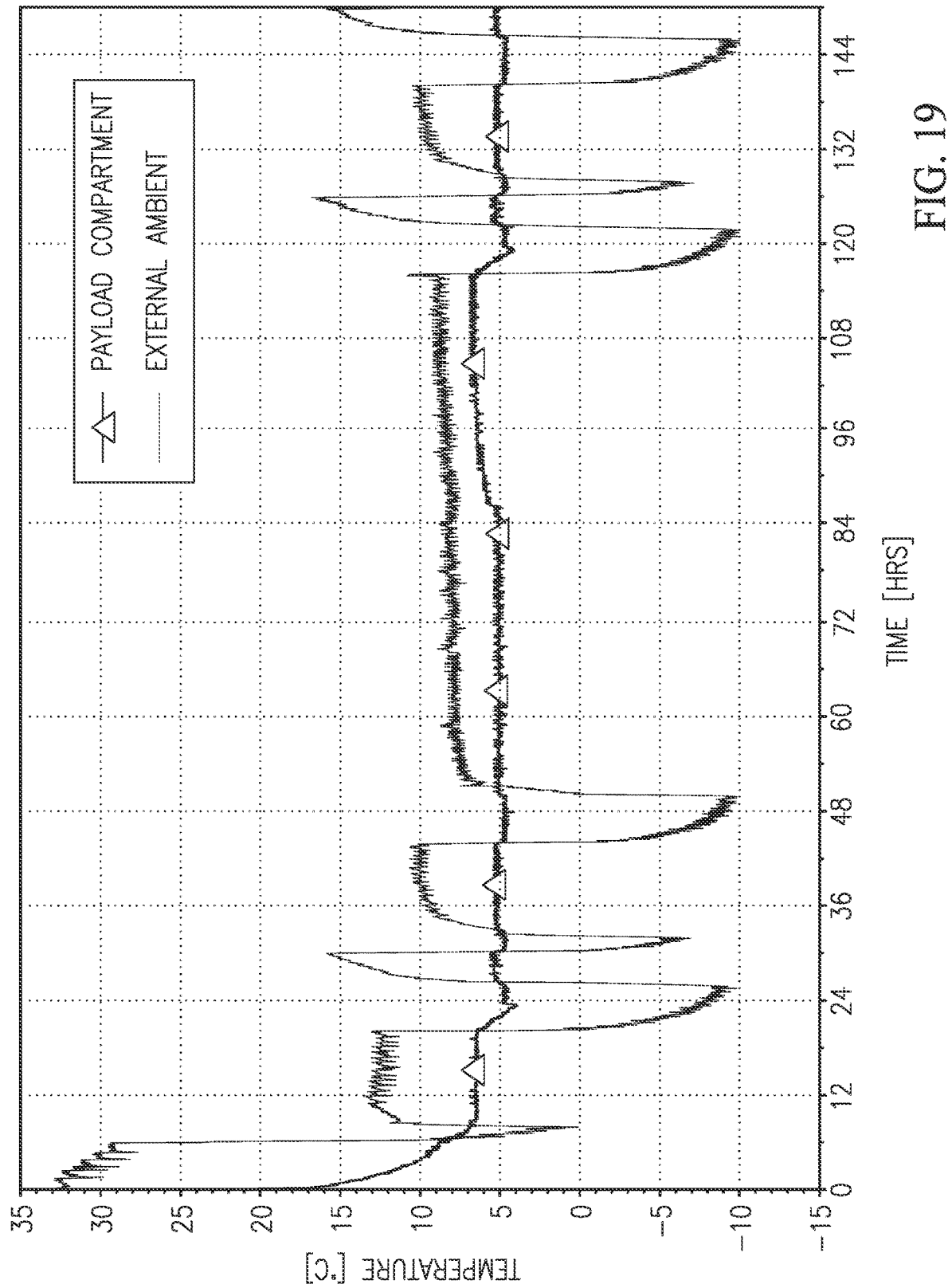
FIG. 19 is a graph of thermal performance of a second example temperature-controlled container using a sorption heat pump, phase change material buffers and a heat pipe heater.
Figure 20:
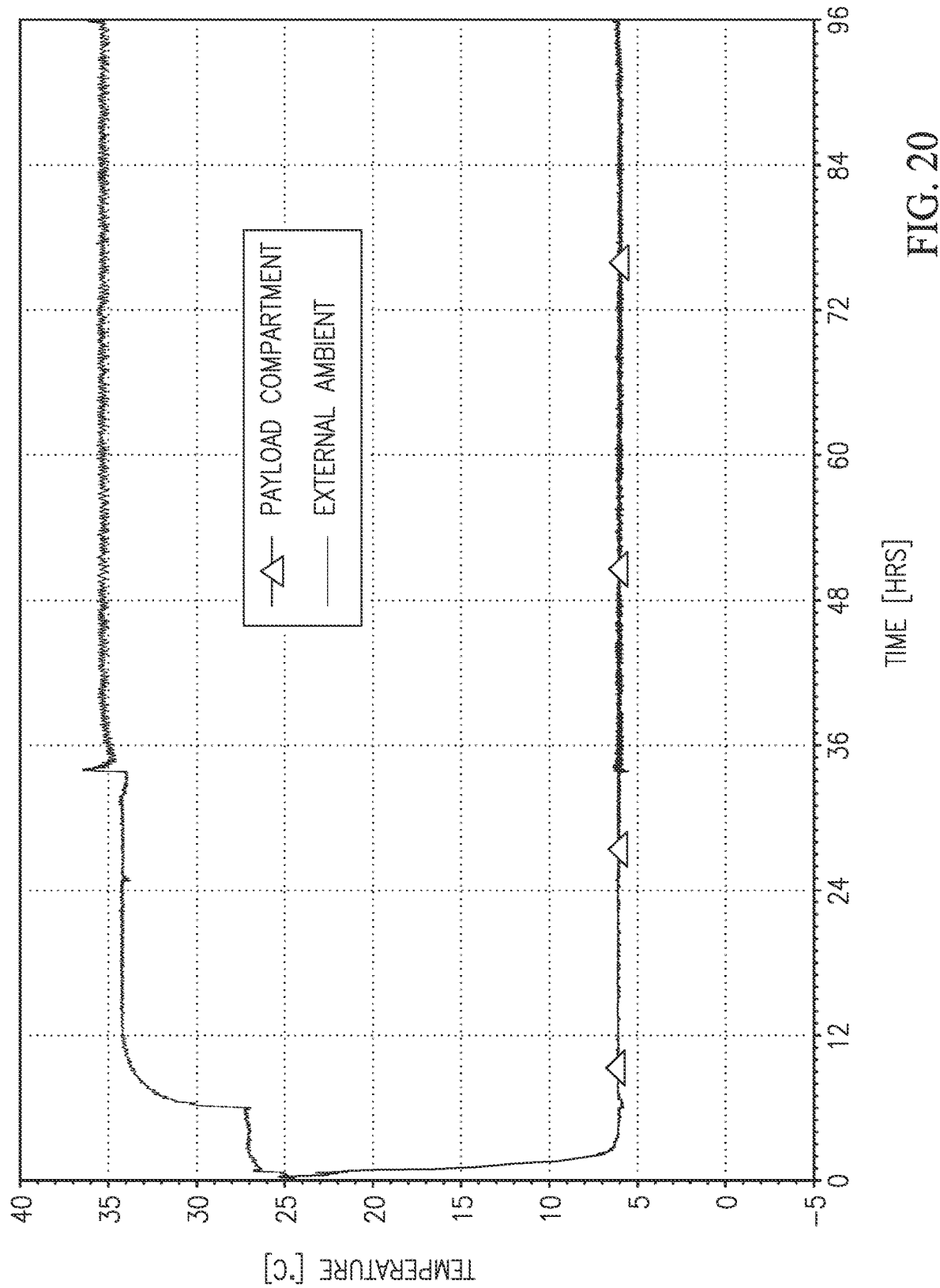
FIG. 20 is a graph of thermal performance of a third example temperature-controlled container using a sorption heat pump, phase change material buffers and a heat pipe heater.
Figure 21:
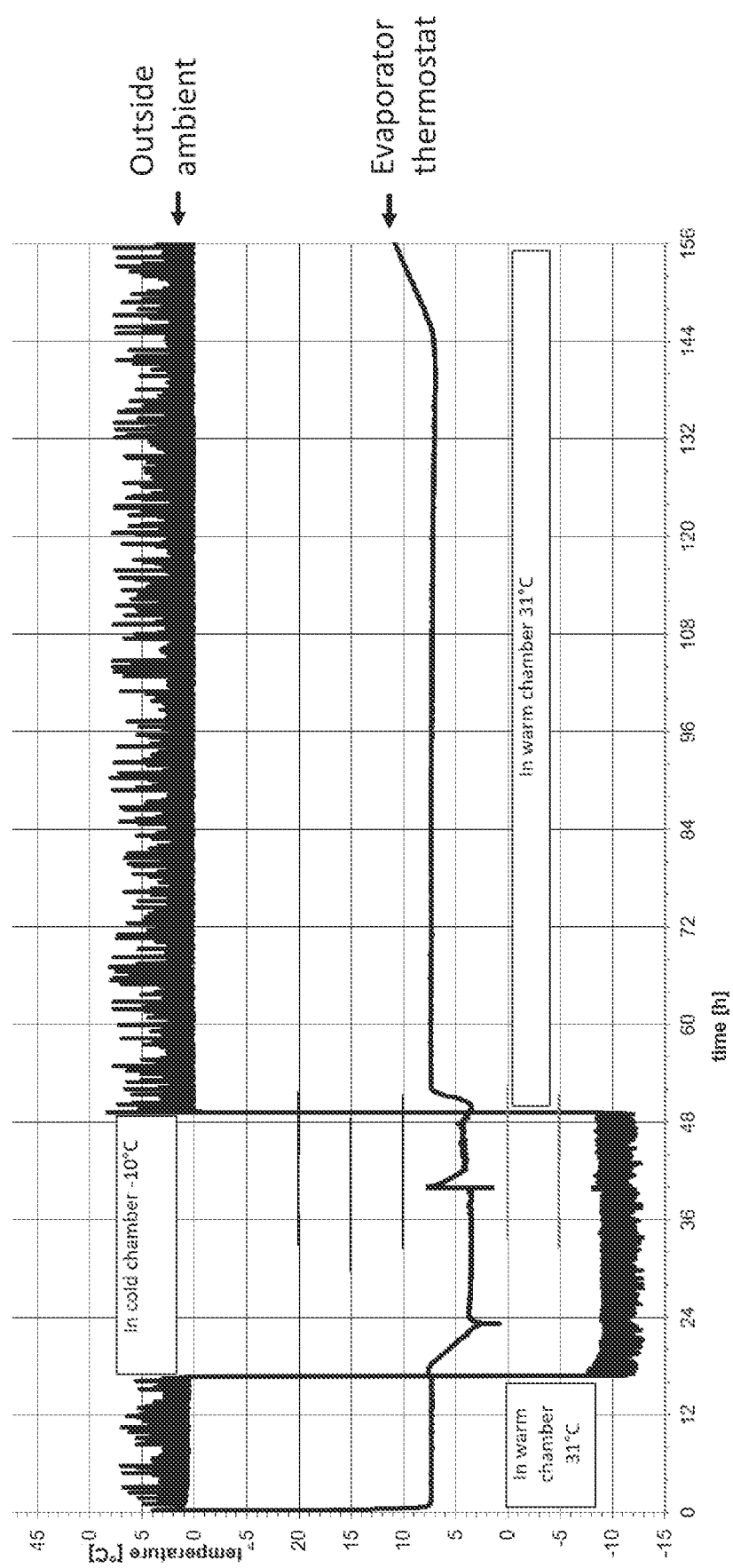
FIG. 21 is a graph of thermal performance of a fourth example temperature-controlled container using a sorption heat pump, phase change material buffers and a heat pipe heater.

In some embodiments, the properties of the sorption heat pump system 100 and a PCM buffer 150 are combined to create an integral, shelf-stable thermal regulation system that does not require any external energy input during heating or cooling. The system can be used to maintain a compartment within a predetermined temperature range, even with varying external temperatures, without any external inputs. FIGS. 18 to 21 show prototype temperature data from such a system. In FIGS. 18 to 21, the desired payload compartment temperature is 2-8° C. In FIG. 18, the payload compartment drops below 2° C. when the external ambient is below 0° C. because the PCM buffer 150 is not in place. In FIG. 19, the payload compartment does not drop below 4° C. even when the external ambient temperature is below 0° C. because the PCM buffer 150 and the evaporator 120 work together as a heat pipe to distribute the heat within a payload compartment 210 (for example, see compartment in FIG. 6). In FIG. 20, the payload compartment 210 stays under 7° C. even when the external ambient is 35° C. In FIG. 21, the payload compartment 210 stays between 2° C. and 8° C. at ambient temperature as low as −10° C. and as high as 31° C.

In some embodiments, such a system that combines a sorption heat pump and phase change material can be used to keep a compartment or item cold or hot. For example, to keep something cold, the evaporator side of a sorption heat pump system may reach −15° C. If the desire is to maintain the cool side temperature at 5° C., a 5° C. PCM could be added to the system such that the PCM absorbs any excess energy between 5° C. and −15° C. from the evaporator.

The invention, in some embodiments, is a system that can regulate temperature using the sorption heat pump 100 and the phase change material PCM buffer 150. The PCM buffer can be used in multiple ways. One option is to maintain the desired internal temperature of a compartment by absorbing and/or releasing energy from or into a heat pump. Another option is to maintain the desired internal compartment temperature by absorbing and/or releasing energy from or into the exterior environment.

Figure 6:
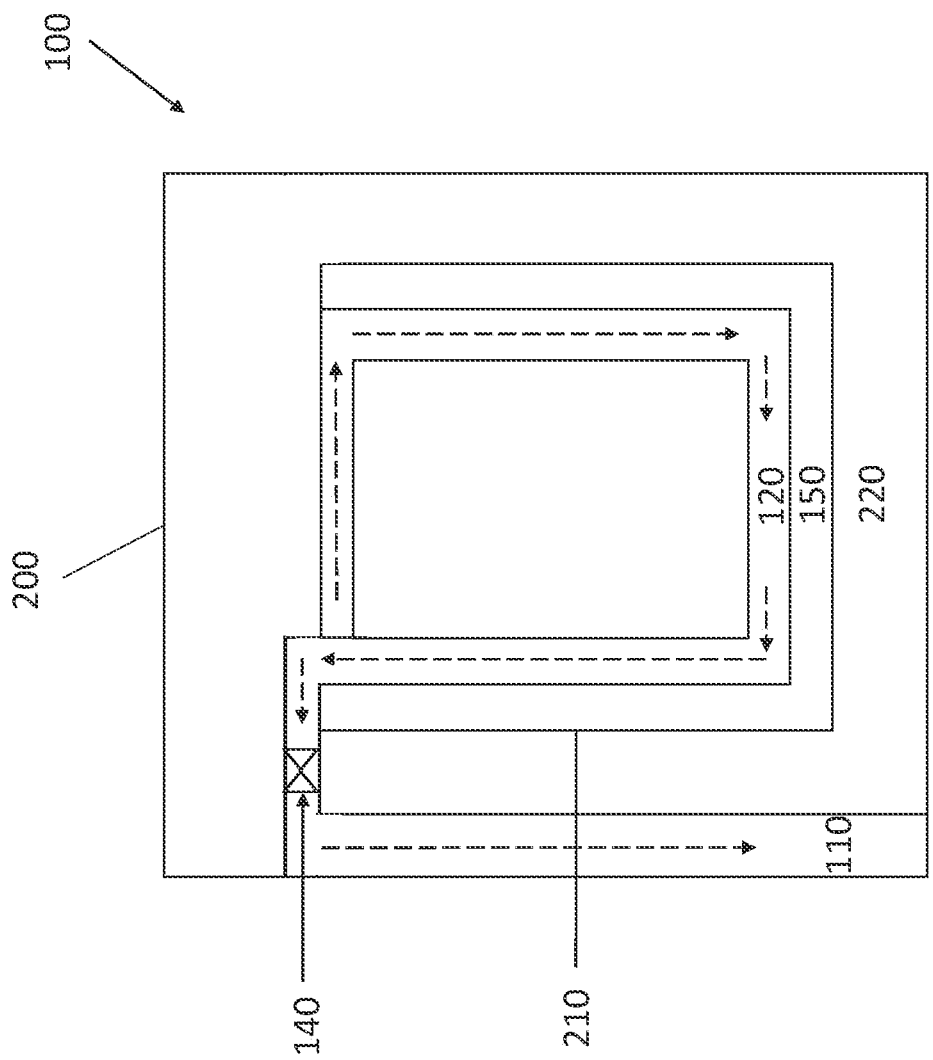
FIG. 6 is a schematic cross section drawing of a temperature-controlled container with a thermal regulation system in cooling configuration using a sorption heat pump and a phase change material buffer.

In FIG. 6, the sorption heat pump system 100 and the phase change material PCM buffer 150 are integrated into a thermal regulation system in a temperature-controlled container 200. FIG. 6 shows a system in which the payload compartment 210 is maintained at a temperature cooler than the ambient outside temperature surrounding the temperature-controlled container 200. The evaporator 120 and the phase change material buffer 150 are both situated inside an insulation layer 220. A preferred embodiment is where the phase change material buffer 150 is positioned between the evaporator 120 and the inward payload compartment 210 wall. The sorber 110 is situated outside the insulation layer 220. The phase change material PCM buffer 150 has a high specific energy density (for example, it can be a material with a phase transition at 5° C. with a thermal storage capacity of 200-250 J/g). In the preferred embodiments, the temperature-controlled container 200 may be positioned inside an outer carton. In this case, the outer carton should be vented in the area near the sorber 110 to assist with heat rejection from the sorber to the environment.

Figure 7:
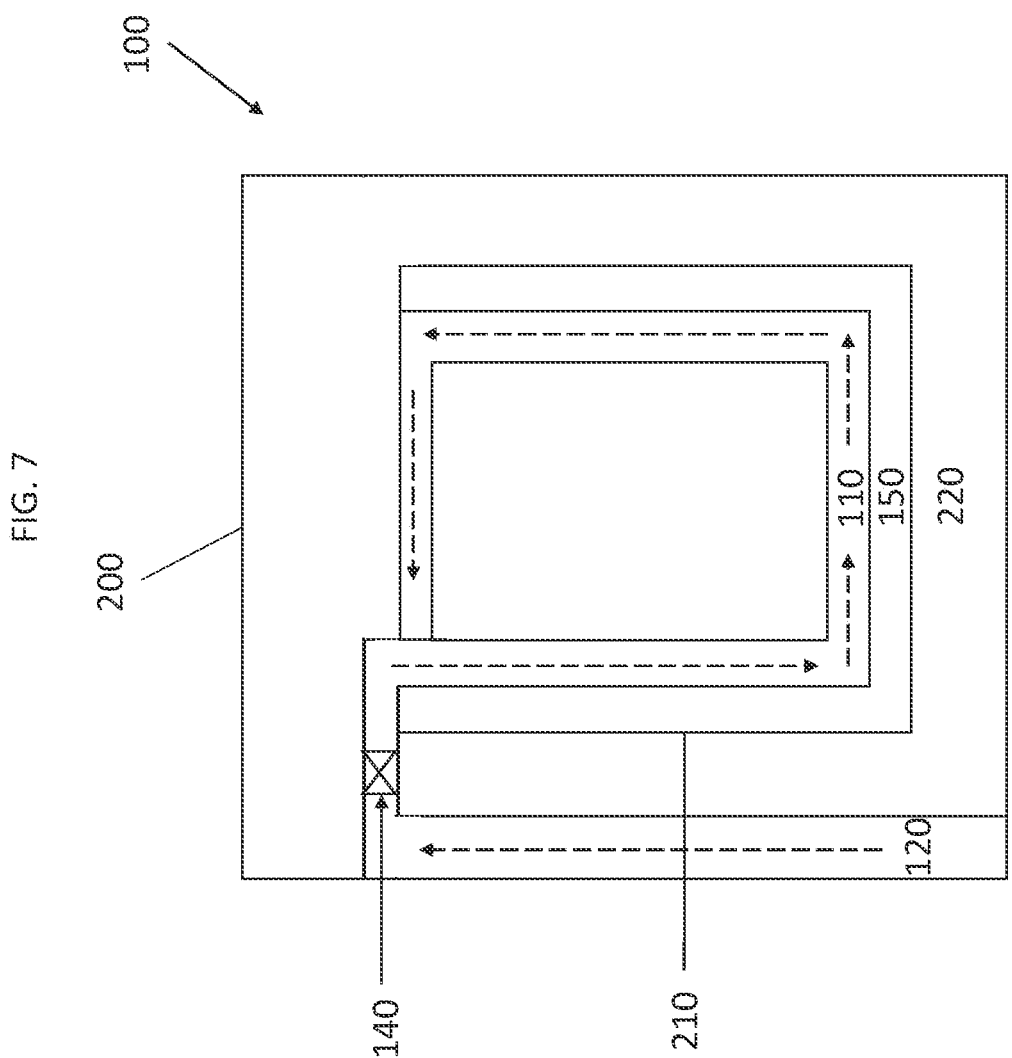
FIG. 7 is a schematic cross section drawing of a temperature-controlled container with a thermal regulation system in heating configuration using a sorption heat pump and a phase change material buffer.

Another embodiment of the invention, shown in FIG. 7, has the payload compartment 210 temperature kept at a temperature warmer than the surrounding ambient temperature outside the temperature-controlled container 200. This is possible by changing the orientation of the evaporator 120 and sorber 110. For the payload compartment 210 to be kept warm, the evaporator 120 is placed exterior of the insulation layer 220 and the sorber 110 is situated interior of the insulation layer 220. This allows transfer of heat from outside the payload compartment 210 to inside the payload compartment 210. The phase change material PCM buffer 150 stores a significant amount of energy at higher temperatures (for example, an 80° C. phase change material with a thermal storage capacity of 220 J/g).

Figure 8:
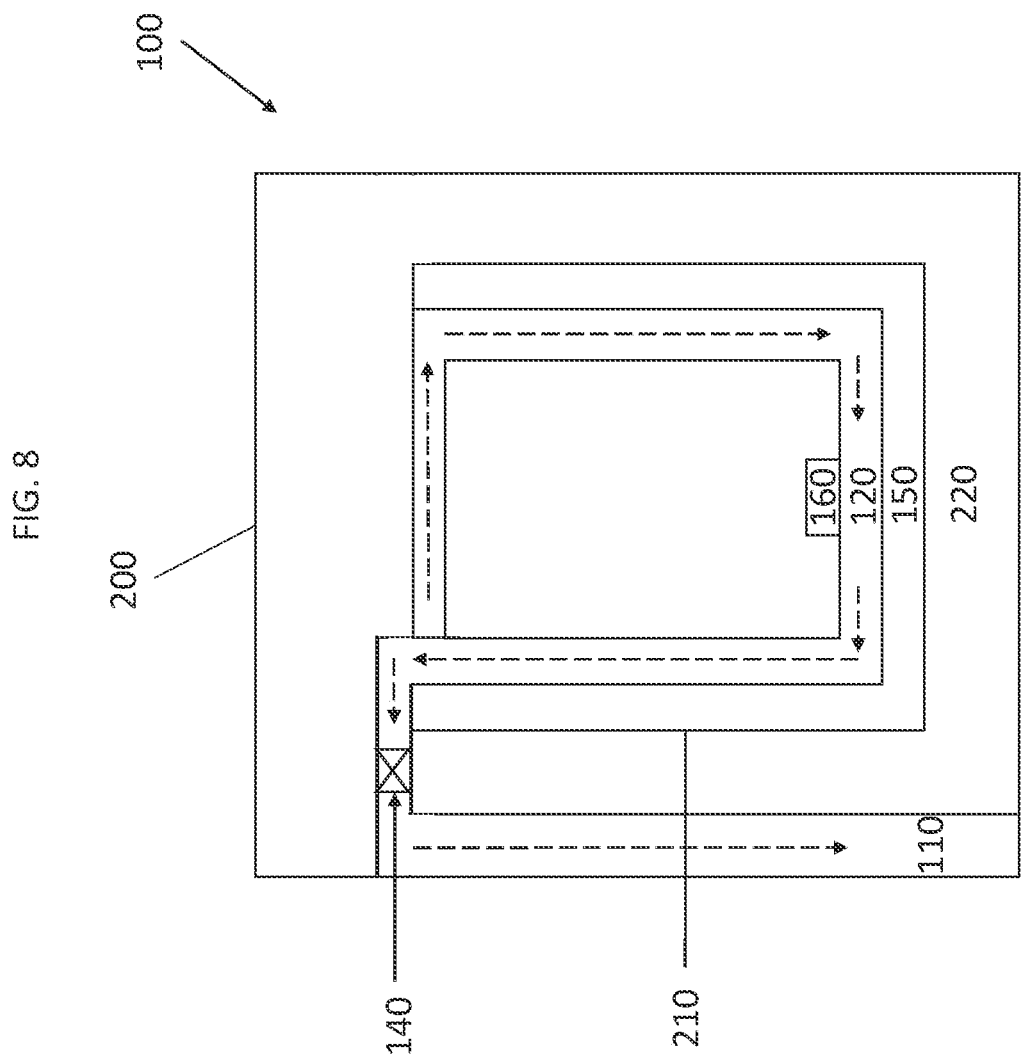
FIG. 8 is a schematic cross section drawing of a temperature-controlled container with a thermal regulation system in universal configuration using a sorption heat pump, a phase change material buffer, and a heat pipe heater.

An additional embodiment of the invention is shown in FIG. 8. This embodiment comprises a temperature-controlled container 200 that cools the payload compartment 210 when the outside ambient temperature is hotter than the desired payload compartment temperature while also heating the payload compartment 210 when the outside ambient temperature is lower than the desired payload compartment temperature range. This can be achieved by the evaporator 120 and the phase change material PCM buffer 150 both being placed interior of the insulation layer 220 while the sorber 110 is placed exterior of the insulation layer 220. In the cooling mode, the thermal control unit 140 of the sorption heat pump system 100 is set to maintain a temperature range inside the payload compartment 210 by regulating the amount of vapor transferred (and therefore the amount of cooling) from the evaporator 120 to the sorber 110, for example by means of a thermostat. When the outside ambient temperature drops below the desired payload compartment temperature range, the thermal control unit 140 stops the flow of vapor, thereby effectively stopping the transfer of heat through vapor from the inside of the payload compartment 210 to the outside of the compartment. The system then enters a passive heating mode. In passive heating mode, the phase change material PCM buffer 150 begins to freeze, which releases its latent heat into the payload compartment 210. This latent heat then maintains the payload compartment temperature within the desired range until the PCM buffer is completely frozen. In very cold ambient temperatures, the phase change material PCM buffer 150 can be replaced or augmented by a different heat source, such as a heat pipe heater 160. The heat pipe heater 160 is integrated with the evaporator 120 so that a heat pipe effect distributes heat from the heat pipe heater 160 throughout the evaporator 120. For example, if the desired payload compartment temperature is 2-8° C. at ambient temperatures ranging from −10° C. to 35° C., the sorption heat pump system can be used to cool the compartment to the desired range when the ambient temperature is above 5° C. When the ambient temperature is below 5° C., for example, a 4° C. phase change material PCM buffer can be used to passively raise the payload compartment temperature to the desired range of 2-8° C. until the PCM buffer is frozen. When the PCM buffer 150 is frozen, the thermal control unit 140 activates the heat pipe heater 160, thereby heating the payload compartment 210 through the heat pipe effect with the evaporator 120. The phase change material can be used to stay above freezing temperature in the compartment. In some embodiments, the heating and cooling modes can be reversed and/or repeated.

Figure 9:
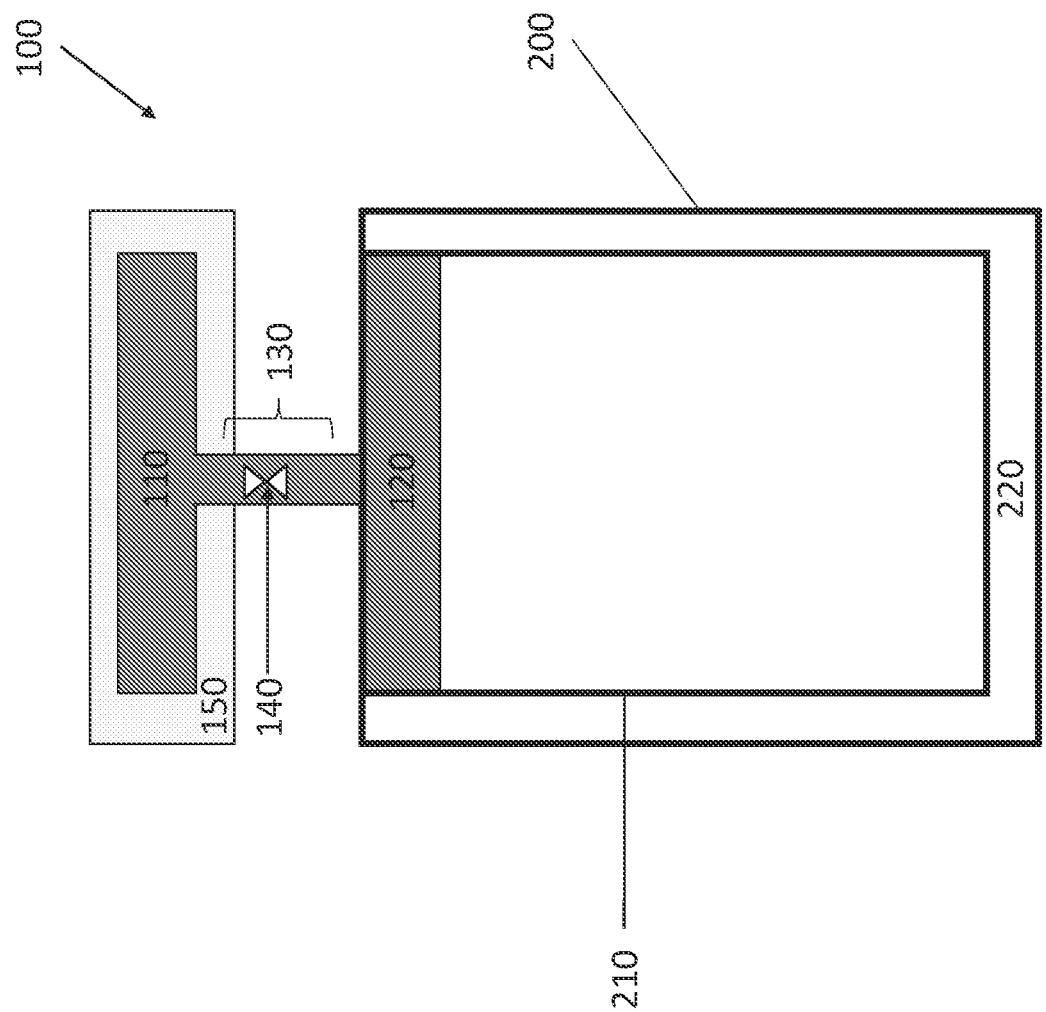
FIG. 9 is a schematic cross section drawing of a temperature-controlled container with a thermal regulation system in cooling configuration using an externally rechargeable sorption heat pump and a phase change material buffer in contact with the sorber.
Figure 10:
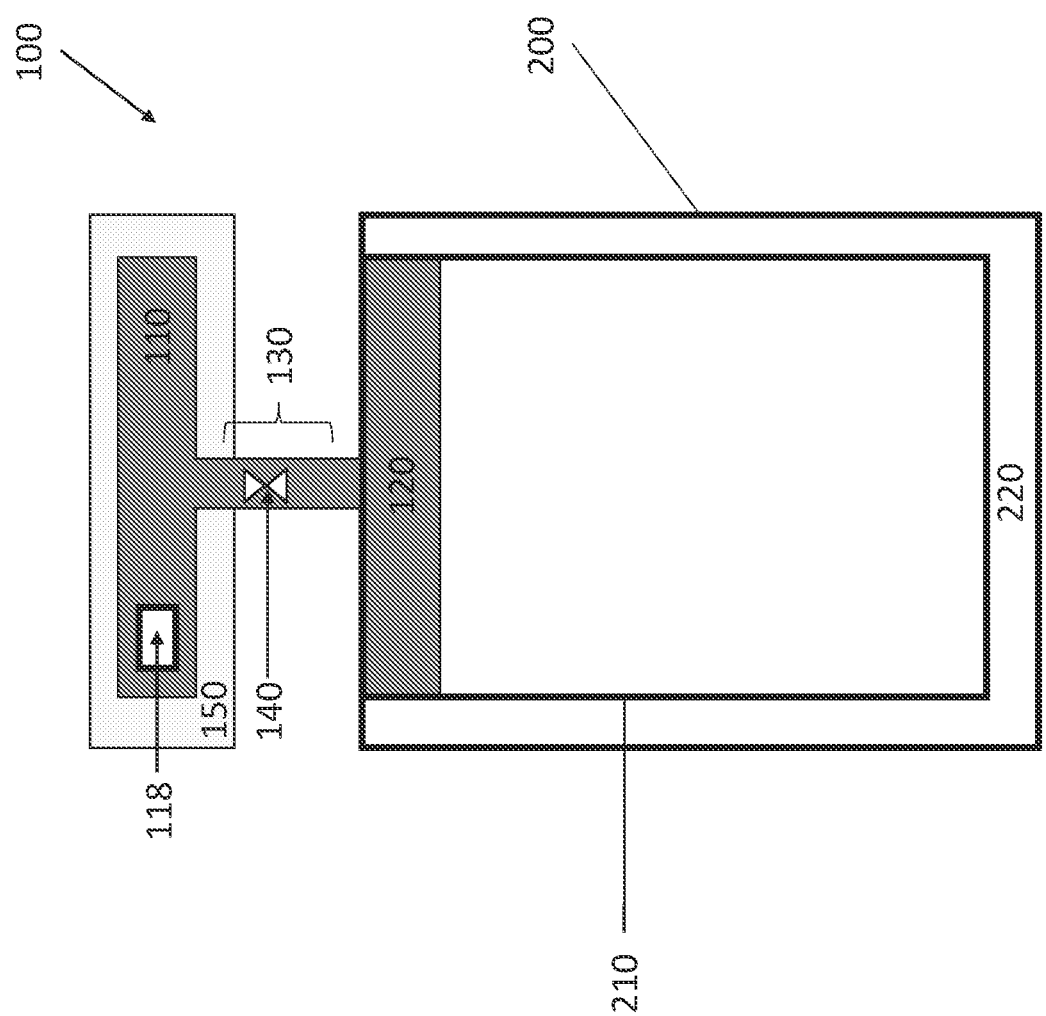
FIG. 10 is a schematic cross section drawing of a temperature-controlled container with a thermal regulation system in cooling configuration using an internally rechargeable sorption heat pump and a phase change material buffer in contact with the sorber.

FIGS. 9 and 10 show an additional embodiment of the invention in cross section. In these figures, the PCM buffer 150 is in thermal contact with the sorber 110. The PCM buffer 150 absorbs heat from the sorber 110 in order to regulate the temperature of the sorber 110 and protect the user from excess heat coming from the sorber 110. The evaporator 120 is situated inside the payload compartment 210 and cools the payload compartment 210. The vapor pathway 130 permits the flow of vapor from the evaporator 120 to the sorber 110. The thermal control unit 140 regulates the flow of vapor from the evaporator 120 to the sorber 110 in order to reach a temperature range inside the payload compartment 210. The payload compartment 210 and evaporator 120 are surrounded by a container 200, such as a vacuum insulated bottle. The amount and temperature range of the PCM buffer 150 is calculated according to the evaporator size, amount of material to be cooled, and the heat leak of the insulation layer 220. FIG. 10 includes an additional component, a sorber heating coil 118. The sorber heating coil 118 is used to heat the sorber 110 to recharge the sorption heat pump.

Some embodiments of the invention may be combined with a compressor system, or another variety of an existing system. The embodiment can be a battery free cooling and heating system for controlling temperature of a portable unit, but there may be instances when combining the invention with a compressor-based system (which does require batteries or electricity during use), could be desirable. For example, one may want the invention described as a backup system to a standard compressor-based cooling system or another variant or type of system.

As noted above, the sorption heat pump system 100 contains the thermal control unit 140, that allows for start stop (or on/off) system function. This results in the system being able to be stored ready to use at a variety of ambient temperatures and the temperature regulation function can be started or stopped as desired by the user, or as set by a control mechanism. For example, the on/off function may be triggered based on time or thermal thresholds (such as internal or external temperature and/or pressure or a combination thereof). As an additional example, the system could be started after a set amount of time, for instance as a backup system to provide cooling.

The temperature control system can be configured for use multiple times on a single "charge" where one could have temperature regulation activated for a period of time, then stop the temperature regulation for a period of time, then restart the temperature regulation again without needing any external inputs such as electricity, batteries, ice, or other new phase change materials. This can be repeated any number of times.

The temperature control system can also be a single-use or 'irreversible' control, such that once the unit is turned on, it must stay on for its full life and cannot be turned off (for example, through mechanical, electronic, or digital means, or a combination thereof). This could be valuable in tamper-evident systems where a user may want to be certain that the device has not been turned on previously.

The sorption heat pump system 100 can be non-separable from the walls of the temperature-controlled container 200.

The sorption heat pump system 100 can be separable from the walls of the temperature-controlled container 200. A fully used sorption heat pump system can be removed from the temperature-controlled container and replaced with a "charged" sorption heat pump system.

The phase change material PCM buffer 150 can be integrated into the evaporator 120 to enable a "heat pipe" effect within the evaporator. A heat pipe is a device, which moves heat via a continuous cycle of evaporation and condensation. Heat evaporates a liquid and the resulting vapor condenses in cooler areas and gives off the heat. This cycle continuously moves heat from warmer to cooler areas quite quickly. This heat pipe effect helps to maintain similar temperatures throughout the evaporator, and therefore throughout the payload compartment 210. The phase change material PCM buffer 150 can be integrated or adjacent to or otherwise thermally connected to the evaporator 120.

The sorption heat pump system 100 can use a specialized custom-designed desiccant as the sorption material that achieves an energy density, for example, of 150 Watthours per kilogram. However, the present invention can function with other varieties of desiccant including those not yet developed.

The evaporator 120 of the sorption heat pump system 100 can be made into a variety of geometric shapes. For example, the evaporator can be configured with any number of planar sides. The planar sides can be situated as to form an enclosed region. The evaporator can be connected thermally to other parts of the surface area of the payload compartment 210, for example, but not limited to, with copper, aluminum, heat pipes, and/or forced convection.

The sorber 110 of the sorption heat pump system 100 may be created using a special hot-fill process. First, the sorption material is heated and dried externally. The temperature range reached during heating needs to be optimized to achieve particular performance requirements without damaging the sorption material or the sorber vacuum barrier material 102 in FIG. 12. The sorber barrier material 102 used around the sorber 110 can be for example, from the list including, but not limited to, a multi-layer foil containing an aluminum or metallized barrier, or stainless steel, glass and/or plastics.

The sorber 110 of the heat pump 100 may be made into a variety of geometric shapes. For example, the sorber could be of a shape from the list including, but not limited to, cylindrical, spherical, and rectangular in a variety of dimensions. The sorber could be connected thermally to a variety of other materials, such as plastics, phase change material, metals, or gas.

Additional components of the system may be heated, degassed, and cleaned in special ways to achieve optimum performance.

The sorption heat pump 100 system can be rechargeable. The sorber 110 can be heated using, for example, but not limited to, heating plates, a water bath, an oil bath, hot air, and/or heating rods. The heating source can be integrated inside the sorber or outside the sorber. The evaporator side can be cooled during recharging using any cooling method, for example, but not limited to, natural convection, forced convection, a liquid bath, an air flow, cold plates, cold fingers, and/or cold sprays.

The thermal control unit 140 may be one or more of several types. For example, the thermal control unit 140 could be composed of a bistable valve that restricts the flow of the working material. The thermal control unit could be composed of an on\off valve. The thermal control unit could include a check valve, or other varieties of valve, or even valves yet to be developed.

In some embodiments, the thermal control unit could also be sensitive to temperature, in this case described as a thermostat. Such a thermostat could be one of several types, such as, but not limited to, a bimetal or capillary component or a pressure regulator thermostat.

The payload compartment 210 may be insulated using any insulative material, such as, but not limited to, vacuum insulation panels (VIPs), cardboard, foam, plastic, fiberglass insulation, and/or vacuum insulation.

The sorption heat pump system 100 could also be used outside of an insulation in order to maintain a standard temperature (e.g., a cooling unit add-on that is placed in front of a fan for rapid temperature-controlled air access at a set temperature).

The sorption heat pump system 100 could be under a vacuum. If under a vacuum, that vacuum could be kept in a variety of ways, either through an active pump or through evacuation and hermetic sealing to maintain the vacuum over time.

The PCM buffer 150 can be physically incorporated into the sorption heat pump system 100 or the PCM buffer could be thermally connected to the sorption heat pump system or the PCM buffer could be separate from the sorption heat pump system and simply part of the same system in effect.

The sorption heat pump system 100 can be used to COOL or HEAT or maintain at a given temperature range.

The evaporative material can be water, which is non-toxic, but is not limited to water. The evaporative working material could also be, but not limited to, ammonia and/or a refrigerant, and/or other materials with an appropriate vapor pressure.

The desiccant can be zeolite, including a binder-free zeolite, but is not limed to zeolites; the desiccant could also be, but not limited to, calcium chloride or silica or other materials that sorb the evaporative working material(s).

The PCM buffer 150 can be liquid or solid or gel, or other states of matter (such as, but not limited to, liquid crystal) or a combination thereof. The PCM buffer can be molded around the evaporator 120, the sorber 110, and/or be placed around the edges of the payload compartment 210.

The sorption heat pump system 100 may be configured for single-use or reusable. The PCM buffer 150 may be configured for single-use or reusable. The temperature-controlled container 200 may be configured for single-use or reusable.

Figure 11:
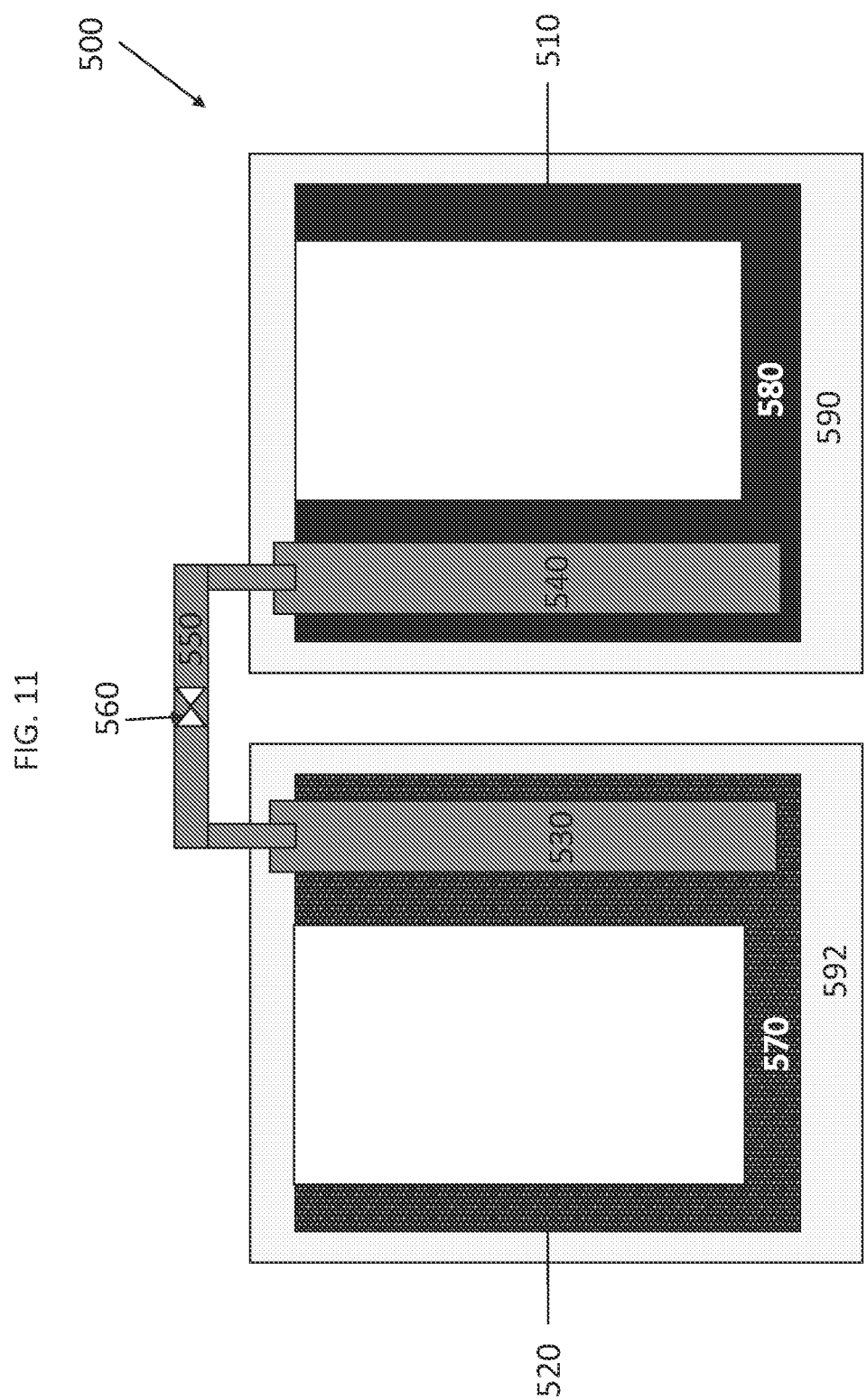
FIG. 11 is a schematic cross section drawing of a two-chamber temperature-controlled container, where each chamber is a different temperature, using a sorption heat pump system and multiple phase change material buffers.

FIG. 11 shows a schematic cross section of an embodiment of a two-chamber temperature controlled container 500 with a sorption heat pump system configured to include two payload compartments 510 and 520 at different temperatures. In this embodiment, the payload compartment 510 is warmed by a sorber 540 and the payload compartment 520 is cooled by an evaporator 530. A warm PCM buffer 580 helps regulate the temperature of the payload compartment 510 and a cool PCM buffer 570 helps regulate the temperature of the payload compartment 520. The payload compartment 510 is heated while the payload compartment 520 is cooled at the same time. A vapor pathway 550 permits the flow of vapor from the evaporator 530 to the sorber 540 as controlled by a thermal control unit 560. The payload compartment 510, the warm PCM buffer 580 and the sorber 540 are surrounded by a warm insulation layer 590. The payload compartment 520, the cool PCM buffer 570 and the evaporator 530 are surrounded by a cool insulation layer 570. Depending on the temperature ranges desired in payload compartments 520 and 510, the PCM buffers 570 and 580 may be individually or both removed. The sorption heat pump system comprising the evaporator 530, sorber 540, vapor pathway 550 and thermal control unit 560 could be swapped in and out for recharging outside of the two-chamber temperature controlled container 500 or it may be charged in place.

Figure 22:
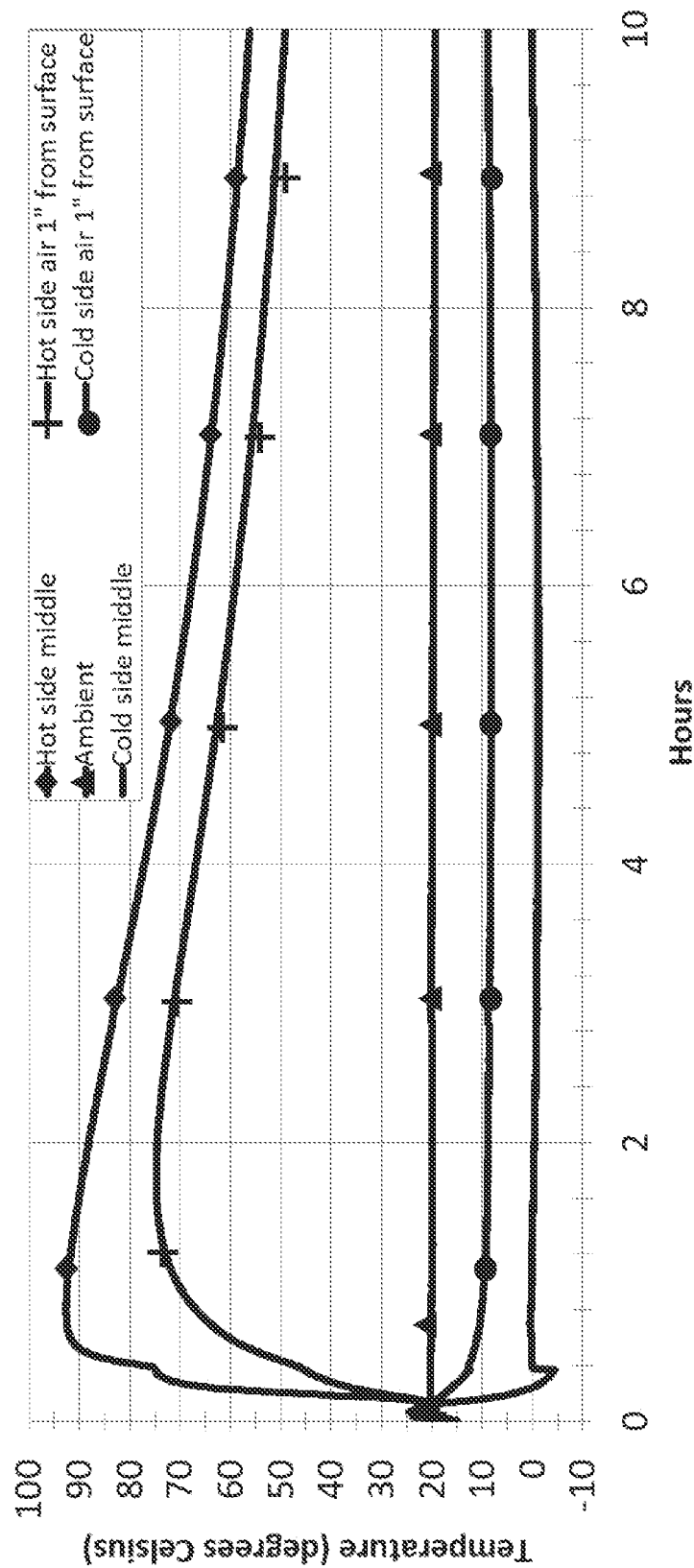
FIG. 22 is a graph of thermal performance of a prototype of the two chamber temperature-controlled container of FIG. 11, where one chamber is heated and one chamber is cooled by the sorption heat pump.

FIG. 22 shows example thermal performance data from a prototype of the two-chamber temperature controlled container 500 of FIG. 11 with a sorption heat pump system. In FIG. 22, "hot side" refers to the sorber 540 and "cold side" refers to the evaporator 530. FIG. 22 shows a payload compartment 510 warmed to temperatures greater than 50° C. and payload compartment 520 cooled to temperatures lower than 10° C. at an ambient external temperature of 20° C.

A benefit of certain embodiments of the temperature-controlled container 200 is the ability to have a device ready to use immediately for regulating temperature without the need for any refrigeration or heating of a phase change material prior to use.

Another benefit of certain embodiments of this system is that it can be lower weight than systems that only use phase change material, given the greater energy density possible in the evaporative phase change process within the sorption heat pump system.

An additional benefit of certain embodiments of this system is being able to not require an active heating or cooling system during use because the combination provides adequate thermal protection. This is particularly true for cold weather protection (versus an active heating system or simply good insulation).

Yet another benefit of certain embodiments of the temperature-controlled container 200 is that the phase change material PCM buffer 150 does not need to be frozen or refrigerated separately from the system, which leads to easier logistics when in use. The entire system can sit at a variety of room temperatures, and once the sorption heat pump valve is opened, the desired system temperature will be reached. This is a significant improvement from existing systems, many of which require either built-in heating or cooling powered by electric input from a battery or other means. In addition, many other systems require external heating or cooling immediately prior to use, which adds significant logistic constraints. Certain embodiments of this system remove both of the aforementioned logistics constraints, which are common in current usage: (1) No external energy input is required during use to maintain the desired temperature, and (2) No active heating or cooling systems are required immediately prior to system use.

A further benefit of certain embodiments of the sorption heat pump system 100 is the use of the thermal control unit 140 to control when the system is in operation. When the thermal control unit opens the valve, the system is in active temperature regulation operation. However, the valve can be closed partway through operation and maintain the remaining thermal power of the system. Then, when needed again, the valve can be reopened, all without the need of any external energy input. The switchable nature of the system is valuable in giving additional flexibility for use.

A benefit of certain embodiments of the sorption heat pump system 100 is that they can maintain a set temperature range when the ambient temperature is both either hotter than desired or colder than desired.

Figure 12:
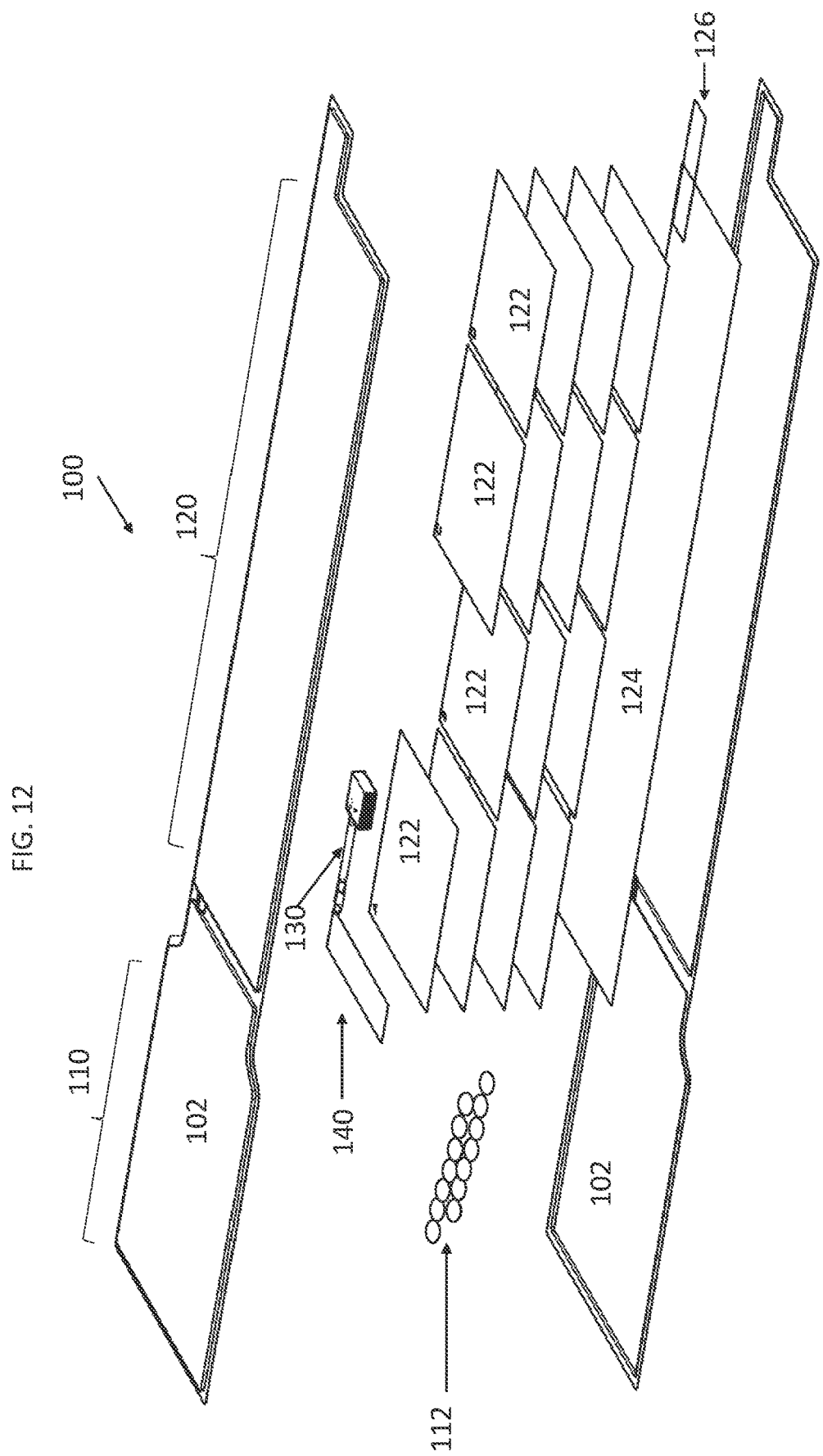
FIG. 12 is an exploded view of the components of the sorption heat pump.

The design of the sorption heat pump system 100 may be in a substantially linear fashion, such as shown in FIG. 12. For the purposes of this embodiment, the sorber 110 section is on the left and the evaporator 120 section on the right, but they may be in different configurations. The thermal control unit 140 is in the middle, though it may be located elsewhere in other embodiments. The width of the sorber 110 and the evaporator 120 may be equal to each other, or they may be unequal. The design may be encased in an external barrier material 102 layer comprised of one or more materials which, depending on the materials, may have different thermodynamic properties; in the case of a barrier of multiple materials they may differ, allowing the system to focus heat pumping into certain areas while limiting the thermodynamic interaction of others.

The thermal control unit 140 may be composed of tubes, pipes, or other material, which allows a flow of vapor while supporting a vacuum area through which the vapor flows. This material may be a uniaxially rigid grid material. The material may also be a biaxial or triaxial grid material.

The thermal control unit 140 may be closed externally by pinching a tube. The tube may be pinched closed by sliding a second component between the tube and a third component. The tube of the thermal control unit may be opened by pulling a tab. In some embodiments, the tube may be closed by using a valve and/or plug. The tab may be a substantially rectangular component; however, the tab may take other shapes and configurations for other embodiments. In some embodiments, the tube may be flexible while in others it may be inflexible, and utilize alternative methods of closing.

Figure 16A:
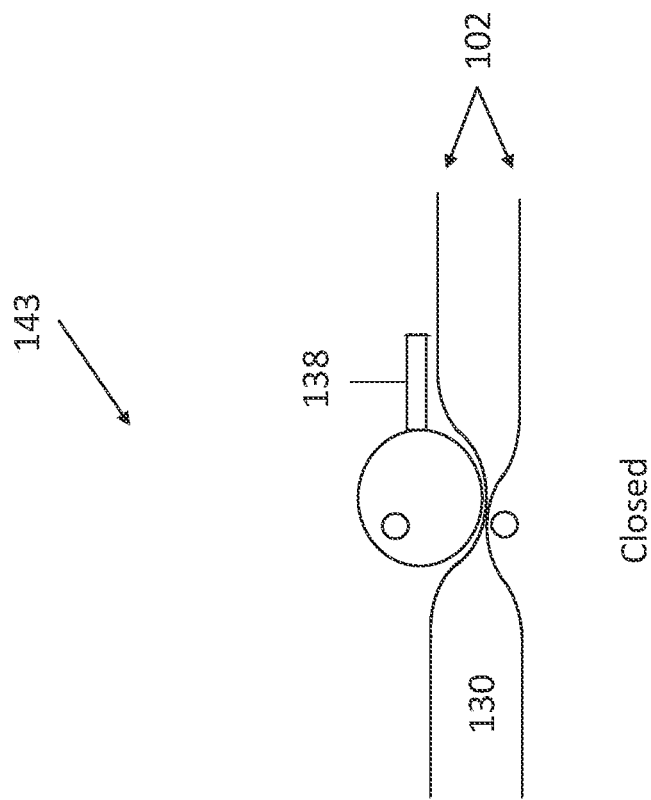
FIG. 16A is a cross section view of an example thermal control unit valve mechanism shown with the vapor pathway opened.
Figure 16B:
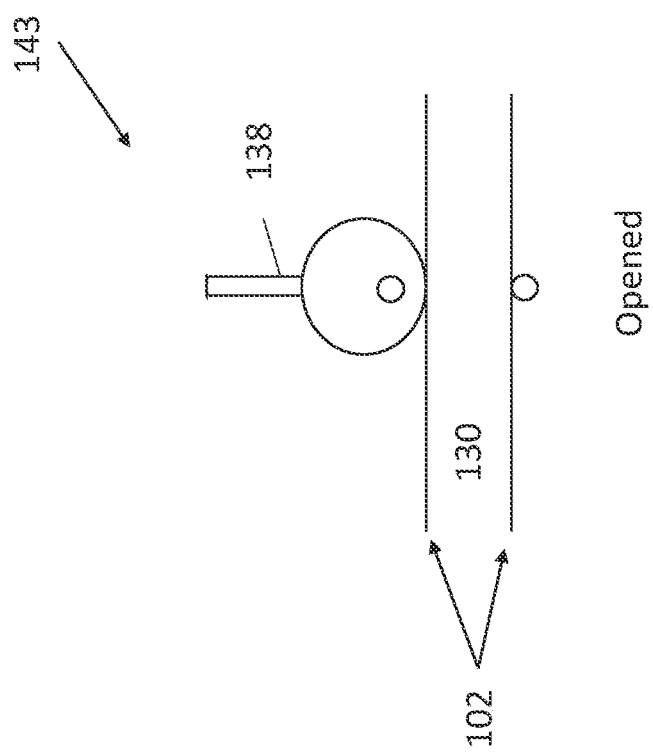
FIG. 16B is a cross section view of the example thermal control unit valve mechanism of FIG. 16A shown with the vapor pathway closed.
Figure 16C:
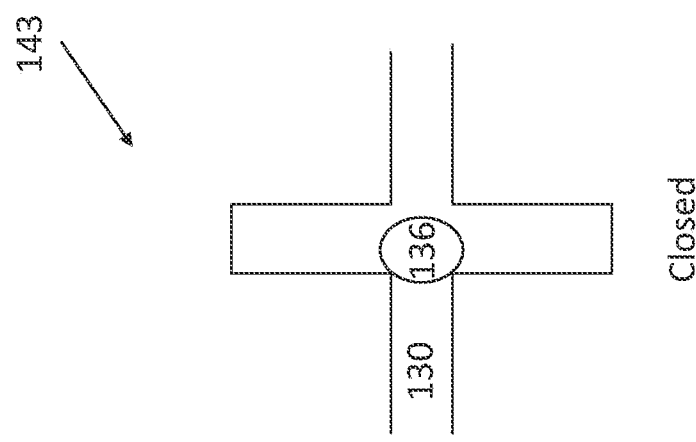
FIG. 16C is a cross section view of a second example thermal control unit valve mechanism using an internal stopper forming a barrier within the vapor pathway, shown with the vapor pathway opened.
Figure 16D:
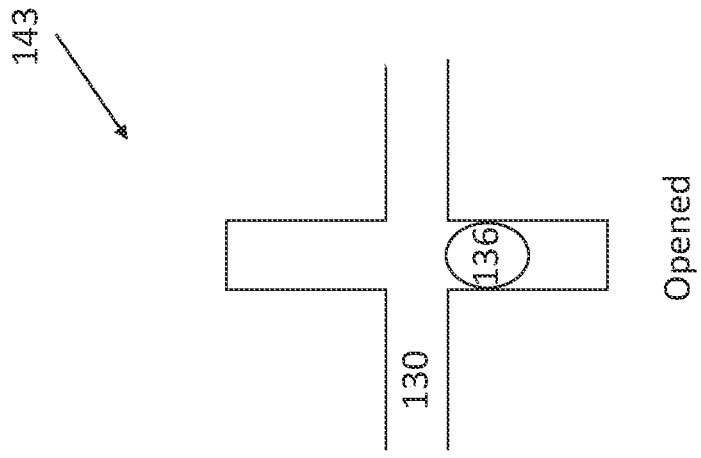
FIG. 16D is a cross section view of the second example thermal control unit valve mechanism of FIG. 16C using an internal stopper forming a barrier within the vapor pathway, shown with the vapor pathway closed.

The valve 143 of the thermal control unit 140 may be designed as shown schematically in FIGS. 16A and 16B, or alternatively, as shown schematically in FIGS. 16C and 16D. In FIGS. 16A and 16B, an external actuator 138 is positioned adjacent to the vapor pathway 130. FIG. 16A shows the external actuator 138 in the opened position, which allows vapor to flow through the vapor pathway 130. The actuator 138 is rotated to close the vapor pathway 130 to vapor flow. FIG. 16B shows the valve 143 in the closed position. The actuator 138 is designed to be opened and closed repeatedly, either by a user or by a controller. The external actuator 138 is positioned outward of the vacuum barrier material 102. Other embodiments may involve a switch, button, or pulling mechanism to actuate the valve.

FIGS. 16C and 16D show a vapor pathway 130 composed of a flexible tube wherein lies an internal stopper 136 that is positionable to form a barrier within the vapor pathway 130. The internal stopper 136 is positioned inward of the vacuum barrier material 102. The internal stopper 136 may be placed in the open or closed position via squeezing the tube of the vapor pathway 130 in the appropriate place from the outside. In FIG. 16C, the vapor pathway is shown opened, and in FIG. 16D, the vapor pathway is shown closed. In other embodiments, the tube may instead be rigid or only partially flexible and operated by a valve or other securing means.

In the evaporator section of the sorption heat pump system 100 shown in FIG. 12 by way of example, the location and amount of a sorbing or wicking material 122 should be optimized for optimal performance based on the needs of the user and environment. The amount of this material may be more or less on the bottom of the evaporator 120 once placed interior of the insulation layer 220. The amount of this material may be more or less on the sides, or the top, of the evaporator 120 once placed in the insulation layer 220. In some embodiments, the material may only partially contact the sides of the temperature-controlled container 200 (not shown in FIG. 12), while in others it will be flush or fully contact.

Figure 15:
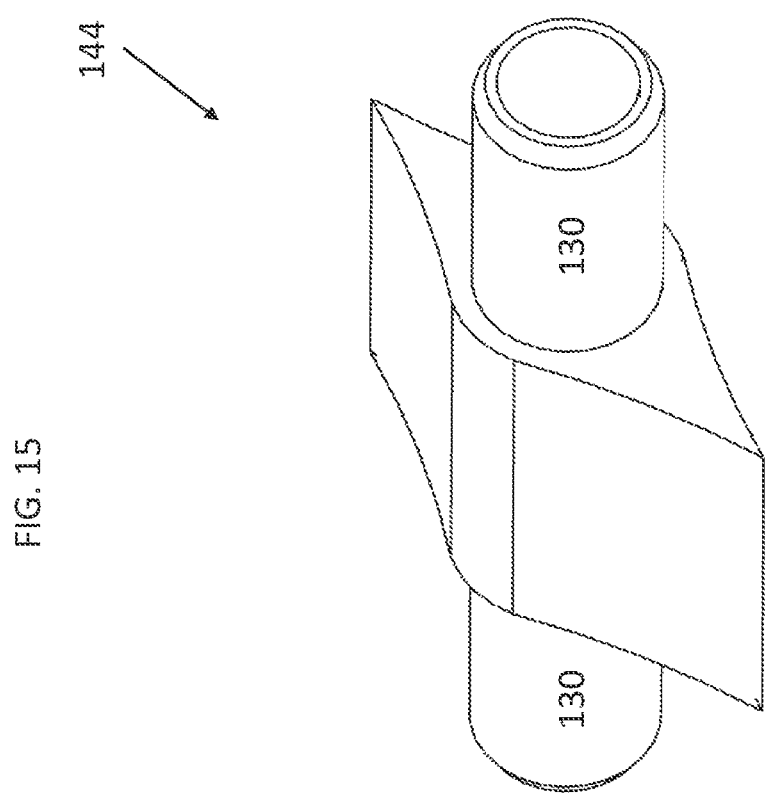
FIG. 15 is an example of a vapor pathway coupler.

The sorber 110 and evaporator 120 of the sorption heat pump system 100 may be connected by one or more coupler(s) 144 (see FIG. 13) which may be attached, welded, glued, or otherwise hermetically sealed to the external barrier material 102. This spout or coupler may then allow vapor flow through only a controlled cross section between the evaporator 120 and the sorber 110. An example of this coupler part is shown in FIG. 15.

The temperature-controlled container 200 may be an insulated box having any number of sides cooled, including 2 sides and the top and bottom. The insulated box may include having the 4 sides cooled but not the top or bottom. In some embodiments all sides of the container may be cooled based on the arrangement of the device; the device may function inside containers with a variety of shapes including a variety of cuboids, cylinders, prisms, or containers taking other shapes.

The sorption heat pump system 100 may be evacuated through one or more evacuation ports 126, as shown in FIG. 12. The evacuation port 126 may be composed of a grid material, which allows gas, and vapor flow through it. The evacuation port 126 may be sealed by means of heat and/or pressure and/or adhesives and/or other sealing means.

Figure 17A:
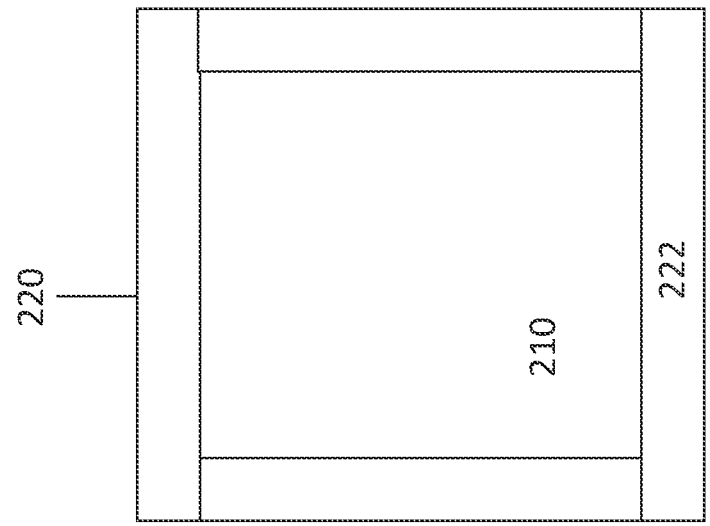
FIG. 17A is a cross section view of an example insulated container made of vacuum insulation panels.
Figure 17B:
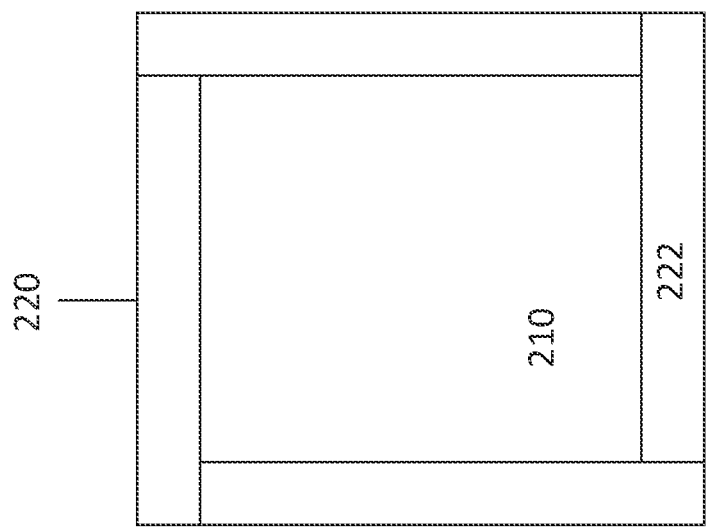
FIG. 17B is a cross section view of another example insulated container made of vacuum insulation panels.

The insulated layer 220, which substantially encloses the payload compartment 210, may be insulated with vacuum insulation panels (VIPs) 222. Two examples of the arrangement of the VIPs 222 are shown in FIGS. 17A and 17B. The VIPs 222 may be arranged such that interior access to the payload compartment 210 is gained through a lid on top, or through a door on a side. Some examples of the invention may incorporate openings or doors that are incorporated into one of the sides or the lid/top; such variants may further incorporate seals to prevent insulation inefficiency.

The shape of the sorber 110 may be formed by a bag. The bag may be a simple 2-sided bag, or the bag may have more than 2 sides. The bag may be shaped similar to a retort bag, or a gusseted bag. Some examples of the sorber 110 section may have a more rigid structure such as a bag that is shaped such that it takes on a rounded-edge cubic shape, or it may be of a rigid enough structure to hold an edged three-dimensional shape.

The vacuum barrier material 102 and the design of the sorption heat pump system 100 should be selected to allow the required functions while minimizing the amount of heat transferred across the insulation layer 220. This can be done by selecting thin materials with low thermal conductivity and by mechanical design which keeps the amount of material crossing the insulation layer 220 to a minimum. If desired for a specific outcome, alternative variants may vary the thickness of the insulation layer 220 on some or all of the sides to achieve results such as fitting in a particular container more securely, or to direct the heat transfer. One such vacuum barrier material 102 is a multilayer laminate material made from layers of differing materials where at least one layer has low gas transfer rates, such as aluminum, and additional material layers, which add strength to the overall laminate and allow for sealing the material together with low gas leak rates. One preferred embodiment of the vacuum barrier material 102 is a multilayer laminate with an aluminum layer of at least seven micrometers thickness and a sealing layer of polypropylene or polyamide with a melting temperature greater than 150 degrees Celsius. While metal or glass traditionally have the lowest gas transfer rates, any material that achieves a helium leak rate of less than 10-4 millibar liters per second is suitable, even if it does not contain metal or glass.

One embodiment of the invention is a shelf-stable temperature-controlled container 200 that can provide a temperature-controlled space independently on-demand without any external inputs (no pre-frozen ice, pre-conditioned PCM, or non-battery electricity must be used). This is accomplished using an inventive thermal regulation system that maintains the temperature of the container within a set range for a period of time. For example, the temperature-controlled container 200 maintains a 12 liter internal volume of space at a temperature between 2-8° C. for at least 96 hours at an external ambient temperature of 30° C. The thermal regulation system is a system that contains the sorption heat pump system 100, and in some embodiments, a phase change material PCM buffer 150. The thermal regulation system also includes the thermal control unit 140 to control the amount of cooling and/or heating supplied by the thermal regulation system, depending on the desired internal temperature and the heat load of the temperature-controlled container 200. The thermal control unit 140 includes a valve to control the vapor flow inside the sorption heat pump.

Temperature-Controlled Container 200:

The standard methods for cooling a portable container include using compressors, thermoelectric devices, or a phase change material such as ice. These all have certain drawbacks: compressors and thermoelectric devices require a near-constant supply of electricity, either via plug or relatively large batteries; compressors are relatively noisy; thermoelectric devices are effective only in limited temperatures ranges and are extremely inefficient; phase change materials require a pre-conditioning process (i.e. freezing) before use and must be kept constantly frozen to avoid melting.

One preferred embodiment of the present invention of the temperature-controlled container 200 is a portable container that avoids all of these drawbacks. The container is "pre-charged" and can then be stored at room temperature before use. When cooling is desired, the thermal control unit 140 is activated and cooling starts immediately, with no need for any external inputs, such as electricity or phase change materials. The preferred embodiment is near-silent, does not require any electrical input or large batteries, is effective across a very wide range of temperatures, is relatively efficient, and does not require any pre-conditioning process immediately prior to use.

The temperature-controlled container 200 consists of several integrated systems. First, the insulated space payload compartment 210 is cooled and/or heated to a set temperature range such as 2-8° C. The purpose of the insulation layer 220 is to limit the amount of heat moving in or out of the payload compartment 210. In this case, the vacuum insulated panels (VIPs) 222 are used as the insulation layer 220; however, the insulation could be vacuum insulation (like vacuum bottles), expanded polystyrene, expanded polypropylene, or other insulating foams or materials. Second, the insulation layer 220 formed by the VIP panels is contained within an outer carton, which may be made of cardboard or plastic. Third, a thermal control unit 140 is used to move, generate, or absorb heat depending on the relative difference between the outside temperature and the desired temperature of the payload compartment 210.

Thermal Regulation System:

The thermal control system is comprised of several integrated systems. First, the sorption heat pump system 100 is used to provide active cooling when the outside temperature is warmer than the desired internal temperature. Second, when the outside temperature is slightly below the desired internal temperature, or below for a relatively shorter period of time, the phase change material PCM buffer 150 containing the phase change material (PCM) is used in concert with the sorption heat pump system 100 to passively maintain the temperature of the payload compartment 210 within a desired specified range. Third, if the outside temperature is significantly lower than the desired internal temperature, or lower for a longer period of time, then the phase change material capacity may be exhausted, in which case a heat pipe heater 160 is used in concert with the sorption heat pump system 100 to maintain the payload compartment 210 at a desired specific temperature. Fourth, the thermal control unit 140 senses the temperature of the payload compartment and regulates the amount of heating and cooling to maintain the payload compartment at the desired specified temperature.

The sorption heat pump system 100 is a system composed of the evaporator 120 and the sorber 110. The sorber 110 is placed outside of the payload compartment 210 and the evaporator 120 is placed inside the payload compartment 210. The sorber and evaporator are joined by the vapor pathway 130 through which heat is transferred by a vapor. The vapor pathway cross section is controlled by the thermal control unit 140, which can variably open and close a valve to allow the vapor to flow through or to slow or halt the flow of vapor. When the valve is open, the vapor evaporates in the evaporator 120 and is adsorbed or absorbed in the sorber 110, thereby transferring heat from the evaporator to the sorber.

Construction of the Sorption Heat Pump System 100:

FIG. 12 shows the internal components of one embodiment of the sorption heat pump 100. The sorption heat pump system 100 uses zeolite 112 as the sorption material in the sorber 110 and water as the working material. In the preferred embodiment, the sorption material is simply placed inward of the barrier material 102 in the sorber. In an additional embodiment, the sorption material is contained inside a removable cartridge and the sorber has a cartridge receiver within which the cartridge is removably positionable. The sorption heat pump system 100 is entirely enclosed in a multilayer foil barrier 102 made of an envelope of barrier material with high gas barrier properties so that a vacuum level of 1-10 millibar may be created and maintained inside the foil barrier 102 envelope made of the barrier material. The zeolite 112 is enclosed in the sorber 110. A conduit comprises the vapor pathway 130 extending between the sorber 110 and the evaporator 120 to allow the flow of water vapor from the evaporator 120 to the sorber 110. Inside the evaporator are several layers of different materials. The wicking material 122 is used to hold and distribute the liquid water around the entire evaporator. A semi-rigid channel material 124 is used to create channels between the wicking material 122 and the foil barrier 102 through which the water vapor can flow freely. When heat is applied to the surface of the evaporator, the liquid water evaporates. The resultant water vapor flows towards the sorber 110 through the channel material 124, eventually flowing through the water vapor pathway 130 into the sorber 110 where the water binds with the zeolite 112. The water vapor moves heat from the evaporator 120 to the sorber 110. The zeolite 112 effectively removes the water vapor from the enclosed environment, which allows more liquid water to evaporate in the evaporator and continue the cooling process. In FIG. 12, the sorber 110, the evaporator 120, the vapor channel 130 and the thermal control unit 140 are all inward of the vacuum barrier material 102. The evaporator 120, the sorber 110, the vapor channel 130 and the thermal control unit 140 may be substantially enclosed in separate vacuum barrier materials. The thermal control unit 140 may be partially inward and partially outward of the vacuum barrier material 102. The thermal control unit 140 may in some embodiments be fully outward of the vacuum barrier material 102.

The cross-sectional size of the vapor pathway 130 depends on the desired amount of heat transferred by the heat pump. A cross-sectional vapor pathway 130 size between 0.01 and 10 square centimeters will achieve heat transfer rates between 0.1 watts and 200 watts. A preferred embodiment has a cross-sectional vapor pathway size between 0.1 and 5 square centimeters. The shape of the cross section of the vapor pathway 130 may also minimize excess heat transfer. A preferred embodiment has a vapor pathway 130 maximum size in one dimension between 0.01 and 2 centimeters.

In the embodiment wherein the sorption material is zeolite and the working fluid is water, the ratio of zeolite to water impacts the correct functioning of the sorption heat pump 100. A ratio between 100 and 500 grams of water per kilogram of desorbed zeolite is desirable, and a ratio of 150-350 grams of water per kilogram of desorbed zeolite is preferred for improved heat transfer and overall system mass. The size and shape of the zeolite 112 also impact improved vapor flow within the sorber 110. A zeolite granule diameter between 0.5 and 12 millimeters is desirable, while a diameter between 2.5 and 5.0 millimeters is preferred.

Phase Change Material PCM Buffer 150:

In some embodiments, the properties of the sorption heat pump 100 and the PCM buffer 150 are combined to create an integrated system that can both cool and heat the payload compartment 210. The cooling is provided by the sorption heat pump system 100 as described above. The heating is provided by the PCM buffer 150. This is accomplished by placing a layer of the PCM buffer 150 in thermal contact with the evaporator 120 of the sorption heat pump system between the insulation layer 220 and the evaporator 120. The layer of the PCM buffer 150 is enclosed in an evacuated foil barrier material 102 envelope with high gas barrier properties.

When the outside temperature is lower than the desired inside temperature, heat flows out of the payload compartment 210. Normally the payload compartment temperature would then decrease. The layer of the PCM buffer 150 acting in concert with the heat pump evaporator 120 arrests and slows this temperature decrease. The heat outflow causes the temperature of the PCM buffer 150 to decrease until the phase change temperature is reached. The PCM then releases latent heat as it changes phase (freezes), thereby arresting and slowing the temperature decrease in the payload compartment 210 for a period of time. The thermal control unit 140 stops the flow of vapor from the evaporator 120 to the sorber 110 when cooling is not desired. The heat pump evaporator 120 then acts in concert with the layer of the PCM buffer 150 as a heat pipe to distribute the PCM latent heat around the payload compartment 210. Otherwise, areas of the payload compartment away from the PCM buffer layer would still continue to fall in temperature. Once the PCM has changed phase completely, the temperature of the payload compartment continues to fall.

In FIG. 6, the sorption heat pump system 100 and the phase change material PCM buffer 150 components are combined with the phase change material acting as a thermal buffer. FIG. 6 shows a system in which the internal payload compartment 210 is maintained at a temperature cooler than the ambient temperature surrounding the compartment. The evaporator 120 and the phase change material PCM buffer 150 are both situated inside the payload compartment 210 in thermal contact with each other. The sorber 110 is situated outside the payload compartment 210. The phase change material has a high specific energy density (for example, it can be a material with a phase transition at 5 degrees Celsius with a thermal storage capacity of 200-250 J/g).

Active Heating Unit:

For most use scenarios, where the outside temperatures stay between −10° C. and 35° C., the sorption heat pump system 100 using the PCM buffer 150 is sufficient. For example, the industry standard ISTA 7D winter test profile can be achieved. In some scenarios, the outside temperature may get colder than −10° C. or stay colder longer than the ISTA 7D winter temperature profile. In that case, an additional heat source is needed. FIG. 8 shows the addition of the heat source in the form of a heat pipe heater 160 in thermal contact with the heat pump evaporator 120. The heat pipe heater 160 heat source may be an electrical resistive heat source, or a chemical heat source, or a thermoelectric heat source. When the layer of the PCM buffer 150 is completely frozen, the thermal control unit 140 turns on the pipe heater to provide additional heat. This additional heat is transported around the payload compartment 210 by the heat pump evaporator 120 acting as a heat pipe.

Figure 13:
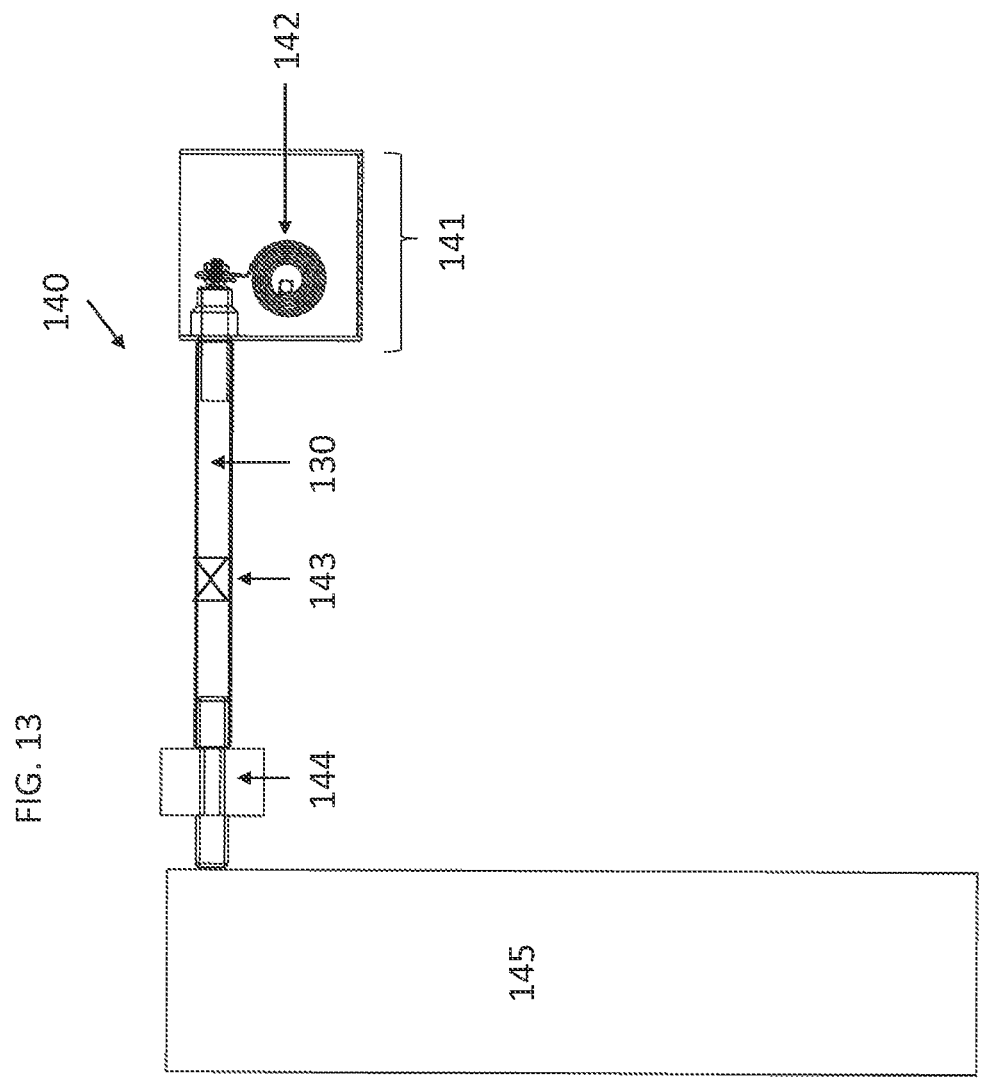
FIG. 13 is a view of an example thermal control unit.
Figure 14:
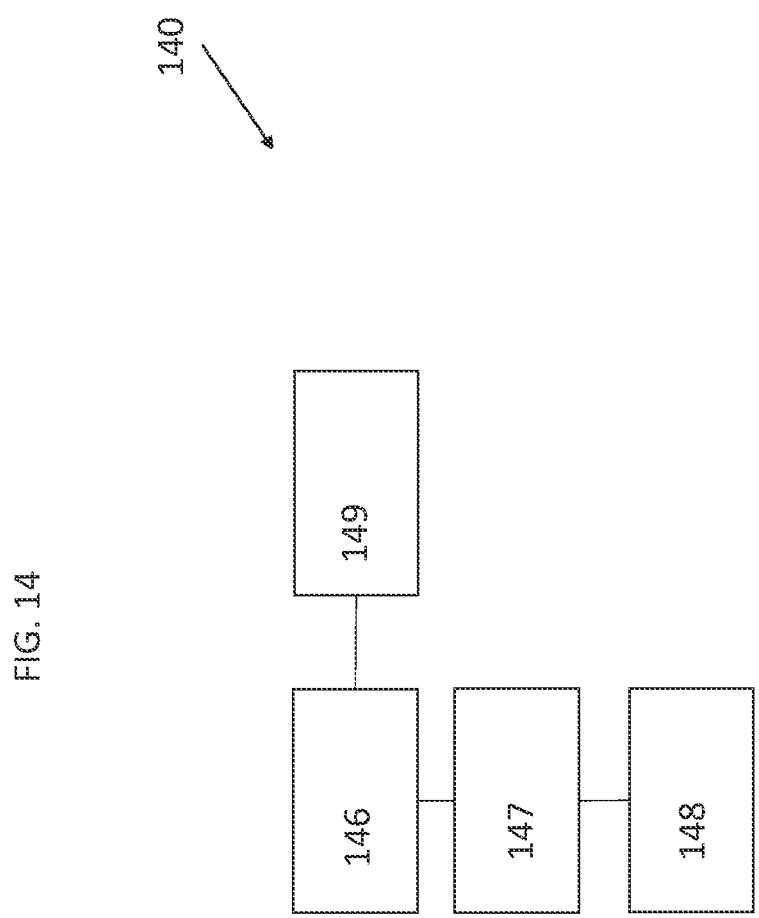
FIG. 14 is a schematic diagram of an example thermal control unit.

Thermal Control Unit 140:

The thermal control unit 140 monitors the temperature of the payload compartment 210, compares it to a desired temperature, and adjusts the cooling and heating rates to reach and maintain the desired temperature. The thermal control unit 140 includes a device to control the rate of flow of water vapor from the evaporator 120 to the sorber 110 in the sorption heat pump system 100. Two examples of this vapor flow rate control are shown in FIGS. 13 and 14. In FIG. 13, a valve 143 is opened and closed by the user or a controller to start and stop the movement of vapor through the vapor pathway 130. The valve 143 may be inward or outward of the vacuum barrier material 102 shown in FIG. 12. The rate of movement of the vapor, and therefore the temperature, is controlled by a mechanical thermostat 141 attached to the vapor pathway 130. Inside the mechanical thermostat 141 is a coil of bimetal 142, which changes shape in response to temperature changes and opens or closes an orifice in the vapor pathway 130. The mechanical thermostat 141 is in thermal contact with the evaporator 120. The bimetal 142 is situated such that it closes the vapor pathway 130 when the payload compartment 210 temperature is below the desired setpoint, and opens the vapor pathway 130 when the temperature of the payload compartment 210 is above the desired setpoint. The vapor pathway 130 is sealed to the material of the barrier 102 by the coupler 144. At the end of the vapor pathway 130 opposite to the mechanical thermostat 141 is a sorber channel 145. The sorber channel 145 distributes the vapor to the zeolite 112 inside the sorber 110.

FIG. 14 shows a schematic diagram for a second example of the thermal control unit 140. A controller 146 measures the temperature inside the payload compartment 210 via a temperature sensor 149. The controller 146 signals a gearmotor 147 to open or close a valve 148 in response to the temperature sensor 149. The valve 148 is situated to open or close (partially or fully) the vapor pathway 130.

Figure 23A:
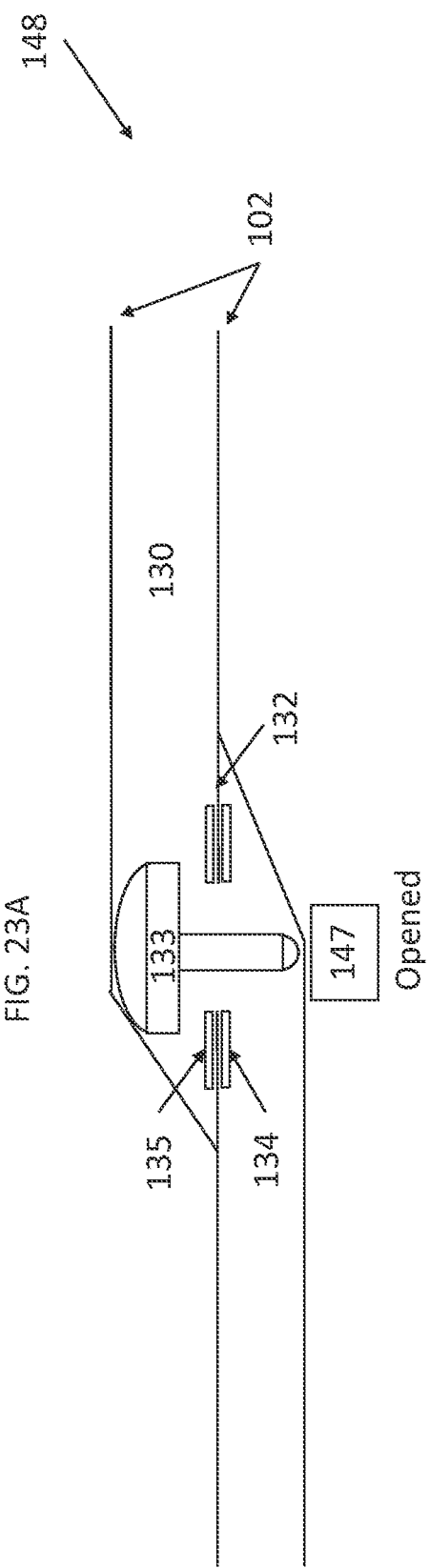
FIG. 23A is a cross section view of a third example thermal control unit valve mechanism shown with a valve operated to open the vapor pathway.
Figure 23B:
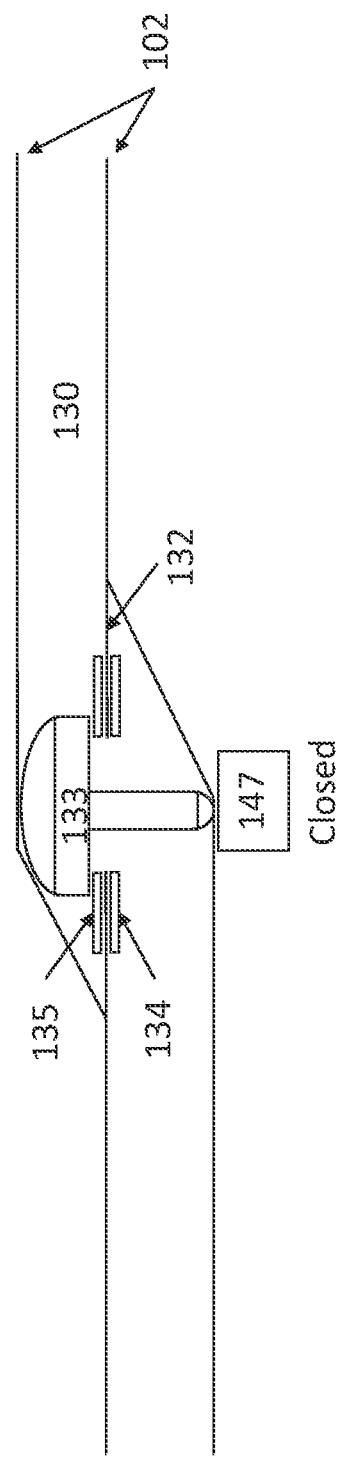
FIG. 23B is a cross section view of a third example thermal control unit valve mechanism shown with the valve operated to close the vapor pathway.

FIGS. 23A and 23B show cross sections of an example valve 148. FIG. 23A shows the valve 148 in the opened position and FIG. 23B shows the valve 148 in the closed position. The vapor pathway 130 is enclosed by barrier material 102. A seal barrier material 132 is sealed at each end to opposite inward sides of the barrier material 102, which completes the internal seal across the vapor pathway 130 when the valve 148 is closed. On one side of the seal barrier 132 is a stabilization plate 134 and on the other side is a seal gasket 135. In the preferred embodiment, a seal pin 133 is normally sealed closed against the seal gasket 135 by atmospheric pressure. In an additional embodiment, the seal pin is in the normally open position and movable to the closed position. The seal pin 133 is movable by a user or by an actuator, such as the gearmotor 147. When the seal pin 133 is in the open position, vapor flows through the vapor pathway 130. The seal pin 133 is opened and closed partially or fully to allow a specific vapor flow rate through the vapor pathway 130 to maintain the temperature in the payload compartment 210 within a specified range.

The thermal control unit 140 does not interact with the layer of the PCM buffer 150, which passively impacts the temperature as described above. The thermal control unit 140 turns the heat pipe heater 160, on and off as needed to reach the desired temperature of the payload compartment 210.

Method of Reuse of Thermal Regulation System:

Some sorption heat pumps are reversible, reconditionable, or "chargeable." This means that the working material can be desorbed from the sorption material, typically by means of pressure and temperature. In some embodiments of the invention, the means of reversing the sorption heat pump system 100 are not built into the sorption heat pump system itself, because this would add additional expense, weight, and space to the product. Instead, a method of reversing, reconditioning, or recharging, the sorption heat pump system in a controlled "recharging" facility, is provided.

After use, the thermal regulation system or sorption heat pump system is returned to a charging facility. The sorption material in the sorber 110 and the working material in the evaporator 120 are removed from the barrier material 102. The sorption material is processed, or reconditioned, or desorbed to prepare the material for another use. The desorbed sorption material and the working material are then replaced into a new barrier material envelope. The sorption heat pump system 100 is then ready for another use.

Embodiments of the present disclosure can be described in view of the following clauses:

1. A sorption heat pump, comprising:
   an evaporator structured to contain a working fluid, and operable to evaporate the working fluid to produce a working fluid gas in the evaporator;
   a sorber structured to contain a sorption material to sorb the working fluid gas during a sorption phase;
   a vapor pathway connecting the evaporator and the sorber; and
   a thermal control unit positioned to control the rate of vapor flow between the evaporator and the sorber through the vapor pathway, and being selectively operable to permit the flow of working fluid gas through the vapor pathway, to next stop the flow of working fluid gas through the vapor pathway, and after stopping the flow to then permit resumption of the flow of working fluid gas through the vapor pathway.

2. The sorption heat pump of clause 1, further including a vacuum barrier material positioned about the sorber and the evaporator to provide a reduced pressure therewithin to promote evaporation of the working fluid at a reduced temperature compared to the temperature required at ambient pressure.

3. The sorption heat pump of clause 2, wherein the vacuum barrier material is a multilayer laminate material.

4. The sorption heat pump of clause 2 or 3, wherein the vacuum barrier material is also positioned about the vapor pathway.

5. The sorption heat pump of clause 4, wherein the vacuum barrier material is a multilayer laminate material.

6. The sorption heat pump of any of clauses 2-5, wherein the thermal control unit is positioned inward of the vacuum barrier material.

7. The sorption heat pump of any of clauses 2-6, wherein the thermal control unit is positioned outward of the vacuum barrier material.

8. The sorption heat pump of any of clauses 2-7, wherein the thermal control unit is positioned partially inward of vacuum barrier material and partially outward of the vacuum barrier material.

9. The sorption heat pump of any of clauses 2-8, wherein the sorption material is zeolite, the working fluid is water, and the reduced pressure is equal to or less than 10 mbar absolute pressure.

10. The sorption heat pump of any of clauses 2-9, wherein the vacuum barrier material is a multilayer laminate material with an aluminum layer of at least seven micrometers thickness and a sealing layer of polypropylene or polyamide with a melting temperature greater than 150 degrees Celsius.

11. The sorption heat pump of any of clauses 1-10, further including a vacuum barrier material positioned about the sorber, evaporator, and vapor pathway to provide a reduced pressure therewithin to promote evaporation of the working fluid at a reduced temperature compared to the temperature required at ambient pressure, the vacuum barrier material being a multilayer laminate material and including first, second, and third multilayer laminate material portions, and the thermal control unit includes a vapor control valve made from the first, second, and third multilayer laminate material portions, a seal gasket, and a seal pin operable to control the rate of vapor flow between the evaporator and the sorber through the vapor pathway, the third multilayer laminate material portion having a first end portion and a second end portion, the first end portion being in sealed engagement with the first multilayer laminate material portion and the second end portion being in sealed engagement with the second multilayer laminate material portion to define an internal barrier, the third multilayer laminate material portion being positioned with the seal gasket to create a stable sealing surface, the seal pin protruding through the third multilayer laminate material portion, but not through the first multilayer laminate material portion or through the second multilayer laminate material portion, the seal pin being located proximal to the seal gasket, and the seal pin being movable toward the sealing surface by atmospheric pressure.

12. The sorption heat pump of clause 11, wherein the thermal control unit further includes a gearmotor positioned outward of the first and second multilayer laminate material portions and proximal to the seal pin, the gearmotor being operable to move the seal pin to at least one of at least partially opening the vapor control valve and at least partially closing the vapor control valve.

13. The sorption heat pump of clause 12, wherein the gearmotor is operable to move the seal pin by pushing on the seal pin and deforming the vacuum barrier material, and closing the vapor control valve by not pushing on the seal pin.

14. The sorption heat pump of clause 12 or 13, wherein the gearmotor is controlled by a controller.

15. The sorption heat pump of any of clauses 1-14, further including a first vacuum barrier positioned about the sorber, a second vacuum barrier positioned about the evaporator, and a third vacuum barrier positioned about the vapor pathway, to provide a reduced pressure therewithin to promote evaporation of the working fluid at a reduced temperature compared to the temperature required at ambient pressure, the first, second, and third vacuum barriers being multilayer laminate materials, and the thermal control unit includes a vapor control valve made from the first, second, and third vacuum barriers, a seal gasket, and a seal pin operable to control the rate of vapor flow between the evaporator and the sorber through the vapor pathway, the third vacuum barrier having a first end portion and a second end portion, the first end portion being in sealed engagement with the first vacuum barrier and the second end portion being in sealed engagement with the second vacuum barrier to define an internal barrier, the third vacuum barrier being positioned with the seal gasket to create a stable sealing surface, the seal pin protruding through the third vacuum barrier, but not through the first vacuum barrier or through the second vacuum barrier, the seal pin being located proximal to the seal gasket, and the seal pin being movable toward the sealing surface by atmospheric pressure.

16. The sorption heat pump of clause 15, wherein the thermal control unit further includes a gearmotor positioned outward of the first and second vacuum barriers and proximal to the seal pin, the gearmotor being operable to move the seal pin to at least one of at least partially opening the vapor control valve and at least partially closing the vapor control valve.

17. The sorption heat pump of clause 16, wherein the gearmotor is operable to move the seal pin by pushing on the seal pin and deforming at least one of the first, second, and third vacuum barriers, and closing the vapor control valve by not pushing on the seal pin.

18. The sorption heat pump of clause 16 or 17, wherein the gearmotor is controlled by a controller.

19. The sorption heat pump of any of clauses 1-18, further including a phase change material buffer positioned in thermal contact with the evaporator to create a heat pipe effect to distribute heat within the evaporator.

20. The sorption heat pump of any of clauses 1-19, wherein the vapor pathway has a cross sectional size between 0.01 and 10.0 square centimeters.

21. The sorption heat pump of any of clauses 1-20, wherein the vapor pathway has a cross sectional size between 0.1 and 5.0 square centimeters.

22. The sorption heat pump of any of clauses 1-21, wherein the vapor pathway has a maximum size in one dimension of between 0.01 and 2.0 centimeters.

23. The sorption heat pump of any of clauses 1-22, wherein the sorption material is zeolite, the working fluid is water, and the ratio of water to zeolite is 100-500 grams of water per kilogram of dry zeolite.
24. The sorption heat pump of any of clauses 1-23, wherein the sorption material is zeolite, the working fluid is water, and the ratio of water to zeolite is 150-350 grams of water per kilogram of dry zeolite.
25. The sorption heat pump of any of clauses 1-24, wherein the sorption material is zeolite, and the size of the zeolite granules is between 0.5 and 12.0 millimeters in diameter.
26. The sorption heat pump of any of clauses 1-25, wherein the sorption material is zeolite, and the size of the zeolite granules is between 1.5 and 8.0 millimeters in diameter.
27. The sorption heat pump of any of clauses 1-26, wherein the sorption material is zeolite, and the size of the zeolite granules is between 2.5 and 3.5 millimeters in diameter.
28. The sorption heat pump of any of clauses 1-27, further including a heater in thermal contact with the sorber to desorb the working fluid from the sorption material to produce the working fluid gas.
29. The sorption heat pump of any of clauses 1-28, wherein the sorber removably retains the sorption material therein and is structured to permit removal of sorbed sorption material and replacement with desorbed sorption material.
30. The sorption heat pump of clause 29, wherein the sorption material is contained inside a removable cartridge and the sorber has a cartridge receiver within which the cartridge is removably positionable, the cartridge retaining the sorption material therein as the sorber sorbs the working fluid gas during the sorption phase.
31. A sorption heat pump, comprising:
  an evaporator containing a working fluid, and operable to evaporate the
  working fluid to produce a working fluid gas in the evaporator;
  a sorber containing a sorption material to sorb the working fluid gas during
  a sorption phase;
  a vapor pathway connecting the evaporator and the sorber; and
  a thermal control unit positioned to control the rate of vapor flow between the evaporator and the sorber through the vapor pathway, and being selectively operable to permit the flow of working fluid gas through the vapor pathway, to next stop the flow of working fluid gas through the vapor pathway, and after stopping the flow to then permit resumption of the flow of working fluid gas through the vapor pathway.
32. A temperature controlled container for maintaining the temperature of a temperature sensitive material, comprising:
  a sorption heat pump, comprising:
    an evaporator structured to contain a working fluid, and operable to
    evaporate the working fluid to produce a working fluid gas in the evaporator;
    a sorber structured to contain a sorption material to sorb the
    working fluid gas during a sorption phase;
    a vapor pathway connecting the evaporator and the sorber; and
    a thermal control unit positioned to control the rate of vapor flow between the evaporator and the sorber through the vapor pathway, and being selectively operable to permit the flow of working fluid gas through the vapor pathway, to next stop the flow of working fluid gas through the vapor pathway, and after stopping the flow to then permit resumption of the flow of working fluid gas through the vapor pathway; and
  a compartment structured to store the temperature sensitive material, the evaporator being positioned inside the compartment and the sorber being positioned outside the compartment.
33. The temperature controlled container of clause 32, further including a phase change material buffer positioned inside the compartment in thermal contact with the evaporator to create a heat pipe effect to distribute heat within the evaporator.
34. The temperature controlled container of clause 33, wherein the compartment includes a compartment wall and the phase change material buffer between the evaporator and the compartment wall.
35. The temperature controlled container of clause 33 or 34, further including a heater in thermal contact with the evaporator, the heater being inside the compartment.
36. The temperature controlled container of any of clauses 32-35, further including a heater in thermal contact with the evaporator, the heater being inside the compartment.
37. The temperature controlled container of any of clauses 32-36, further including an insulation layer positioned about the compartment, the sorber being positioned outward of the insulation layer.
38. The temperature controlled container of clause 37, further including a phase change material buffer positioned inside the compartment in thermal contact with the evaporator to create a heat pipe effect to distribute heat within the evaporator.
39. The temperature controlled container of clause 38, further including a heater in thermal contact with the evaporator, the heater being inside the compartment.
40. The temperature controlled container of any of clauses 37-39, further including a heater in thermal contact with the evaporator, the heater being inside the compartment.
41. The sorption heat pump of any of clauses 32-40, further including a heater in thermal contact with the sorber to desorb the working fluid from the sorption material to produce the working fluid gas.
42. The sorption heat pump of any of clauses 32-41, further including a phase change material buffer in thermal contact with the sorber outside the compartment.
43. The temperature controlled container of any of clauses 32-42, wherein the sorber removably retains the sorption material therein and is structured to permit removal of sorbed sorption material and replacement with desorbed sorption material.
44. The temperature controlled container of clause 43, wherein the sorption material is contained inside a removable cartridge and the sorber has a cartridge receiver within which the cartridge is removably positionable, the cartridge retaining the sorption material therein as the sorber sorbs the working fluid gas during the sorption phase.

45. A temperature controlled container for maintaining the temperature of a temperature sensitive material, comprising:
a sorption heat pump, comprising:
an evaporator containing a working fluid, and operable to evaporate the working fluid to produce a working fluid gas in the evaporator;
a sorber containing a sorption material to sorb the working fluid gas during a sorption phase;
a vapor pathway connecting the evaporator and the sorber; and
a thermal control unit positioned to control the rate of vapor flow between the evaporator and the sorber through the vapor pathway, and being selectively operable to permit the flow of working fluid gas through the vapor pathway, to next stop the flow of working fluid gas through the vapor pathway, and after stopping the flow to then permit resumption of the flow of working fluid gas through the vapor pathway; and
a compartment structured to store the temperature sensitive material, the evaporator being positioned inside the compartment and the sorber being positioned outside the compartment.

46. A temperature controlled container for maintaining the temperature of a temperature sensitive material, comprising:
a sorption heat pump, comprising:
an evaporator structured to contain a working fluid, and operable to evaporate the working fluid to produce a working fluid gas in the evaporator;
a sorber structured to contain a sorption material to sorb the working fluid gas during a sorption phase;
a vapor pathway connecting the evaporator and the sorber; and
a thermal control unit positioned to control the rate of vapor flow between the evaporator and the sorber through the vapor pathway, and being selectively operable to permit the flow of working fluid gas through the vapor pathway, to next stop the flow of working fluid gas through the vapor pathway, and after stopping the flow to then permit resumption of the flow of working fluid gas through the vapor pathway; and
a compartment structured to store the temperature sensitive material, the sorber being positioned inside the compartment and the evaporator being positioned outside the compartment.

47. The temperature controlled container of clause 46, further including a phase change material buffer positioned inside the compartment in thermal contact with the sorber to regulate the temperature of the compartment.

48. The sorption heat pump of clause 46 or 47, further including a heater in thermal contact with the sorber to desorb the working fluid from the sorption material to produce the working fluid gas.

49. The temperature controlled container of any of clauses 46-48, further including an insulation layer positioned about the compartment, the evaporator being positioned outward of the insulation layer.

50. The temperature controlled container of clause 49, further including a phase change material buffer positioned inside the compartment in thermal contact with the sorber to regulate the temperature of the compartment.

51. The temperature controlled container of any of clauses 46-50, wherein the sorber removably retains the sorption material therein and is structured to permit removal of sorbed sorption material and replacement with desorbed sorption material.

52. The temperature controlled container of clause 51, wherein the sorption material is contained inside a removable cartridge and the sorber has a cartridge receiver within which the cartridge is removably positionable, the cartridge retaining the sorption material therein as the sorber sorbs the working fluid gas during the sorption phase.

53. A temperature controlled container for maintaining the temperature of a temperature sensitive material, comprising:
a sorption heat pump, comprising:
an evaporator containing a working fluid, and operable to evaporate the working fluid to produce a working fluid gas in the evaporator;
a sorber containing a sorption material to sorb the working fluid gas during a sorption phase;
a vapor pathway connecting the evaporator and the sorber; and
a thermal control unit positioned to control the rate of vapor flow between the evaporator and the sorber through the vapor pathway, and being selectively operable to permit the flow of working fluid gas through the vapor pathway, to next stop the flow of working fluid gas through the vapor pathway, and after stopping the flow to then permit resumption of the flow of working fluid gas through the vapor pathway; and
a compartment structured to store the temperature sensitive material, the sorber being positioned inside the compartment and the evaporator being positioned outside the compartment.

54. A temperature controlled apparatus, comprising:
a sorption heat pump, comprising:
an evaporator structured to contain a working fluid, and operable to evaporate the working fluid to produce a working fluid gas in the evaporator;
a sorber structured to contain a sorption material to sorb the working fluid gas during a sorption phase;
a vapor pathway connecting the evaporator and the sorber; and
a thermal control unit positioned to control the rate of vapor flow between the evaporator and the sorber through the vapor pathway, and being selectively operable to permit the flow of working fluid gas through the vapor pathway, to next stop the flow of working fluid gas through the vapor pathway, and after stopping the flow to then permit resumption of the flow of working fluid gas through the vapor pathway;
a cool compartment, the evaporator being positioned inside the cool compartment;
a warm compartment, the sorber being positioned inside the warm compartment;
a cool compartment insulation layer positioned about the cool compartment and the evaporator, the warm compartment and the sorber being positioned outward of the cool compartment insulation layer; and
a warm compartment insulation layer positioned about the warm compartment and the sorber, the cool compartment and the evaporator being positioned outward of the warm compartment insulation layer.

55. The temperature controlled unit of clause 54, further including a phase change material buffer positioned in thermal contact with the evaporator.
56. The temperature controlled unit of clause 54 or 55, further including a sorber phase change material buffer positioned in thermal contact with the sorber.
57. The temperature controlled unit of clause 56, further including an evaporator phase change material buffer positioned in thermal contact with the evaporator.
58. The temperature controlled unit of any of clauses 54-57, further including a heater in thermal contact with the sorber to desorb the working fluid from the sorption material to produce the working fluid gas.
59. The temperature controlled unit of any of clauses 54-58, wherein the sorber removably retains the sorption material therein and is structured to permit removal of sorbed sorption material and replacement with desorbed sorption material.
60. The temperature controlled unit of clause 59, wherein the sorption material is contained inside a removable cartridge and the sorber has a cartridge receiver within which the cartridge is removably positionable, the cartridge retaining the sorption material therein as the sorber sorbs the working fluid gas during the sorption phase.
61. A temperature controlled apparatus, comprising:
  a sorption heat pump, comprising:
    an evaporator containing a working fluid, and operable to evaporate the working fluid to produce a working fluid gas in the evaporator;
    a sorber containing a sorption material to sorb the working fluid gas during a sorption phase;
    a vapor pathway connecting the evaporator and the sorber; and
    a thermal control unit positioned to control the rate of vapor flow between the evaporator and the sorber through the vapor pathway, and being selectively operable to permit the flow of working fluid gas through the vapor pathway, to next stop the flow of working fluid gas through the vapor pathway, and after stopping the flow to then permit resumption of the flow of working fluid gas through the vapor pathway;
  a cool compartment, the evaporator being positioned inside the cool compartment;
  a warm compartment, the sorber being positioned inside the warm compartment;
  a cool compartment insulation layer positioned about the cool compartment and the evaporator, the warm compartment and the sorber being positioned outward of the cool compartment insulation layer; and
  a warm compartment insulation layer positioned about the warm compartment and the sorber, the cool compartment and the evaporator being positioned outward of the warm compartment insulation layer.
62. A method for reusing a sorption heat pump having an evaporator containing a working fluid, the working fluid evaporating to a working fluid gas in the evaporator, sorber containing a sorption material to sorb the working fluid gas during a sorption phase, a vapor pathway connecting the evaporator and the sorber, and a thermal control unit positioned to control the rate of vapor flow between the evaporator and the sorber through the vapor pathway comprising:
  providing the sorption heat pump to a user;
  after the user has operated the sorption heat pump to at least partially sorb the sorption material in the sorber, receiving back the sorption heat pump;
  reconditioning the sorption heat pump; and
  providing the reconditioned sorption heat pump to the user or another user.
63. The method of clause 62 where the sorption material is removable from the sorber, wherein the step of reconditioning the sorption heat pump is accomplished by removal of the at least partially sorbed sorption material from the sorber, and then placing at least substantially desorbed sorption material in the sorber.
64. The method of clause 62 or 63 where the sorption material is contained inside a removable cartridge and the sorber has a cartridge receiver within which the cartridge is removably positionable, the cartridge retaining the sorption material therein as the sorber sorbs the working fluid gas during the sorption phase, wherein the step of reconditioning the sorption material is accomplished by removal of the cartridge with the at least partially sorbed sorption material from the cartridge receiver, and then positioning a cartridge with at least substantially desorbed sorption material in the cartridge receiver.
65. A method for reusing a temperature controlled container having a sorption heat pump and a compartment for storing a temperature sensitive material, the sorption heat pump having an evaporator containing a working fluid, the working fluid evaporating to a working fluid gas in the evaporator, a sorber containing a sorption material to sorb the working fluid gas during a sorption phase, a vapor pathway connecting the evaporator and the sorber, and a thermal control unit positioned to control the rate of vapor flow between the evaporator and the sorber through the vapor pathway, comprising:
  providing the temperature controlled container to a user ready for use by the user;
  after the user has operated the sorption heat pump to at least partially sorb the sorption material in the sorber, receiving back the temperature-controlled container with the at least partially sorbed sorption material;
  reconditioning the sorption heat pump; and
  providing the temperature controlled container with the reconditioned sorption heat pump to the user or another user.
66. The method of clause 65 where the sorption material is removable from the sorber, wherein the step of reconditioning the sorption heat pump is accomplished by removal of the at least partially sorbed sorption material from the sorber, and then placing at least substantially desorbed sorption material in the sorber.
67. The method of clause 65 or 66 where the sorption material is contained inside a removable cartridge and the sorber has a cartridge receiver within which the cartridge is removably positionable, the cartridge retaining the sorption material therein as the sorber sorbs the working fluid gas during the sorption phase, wherein the step of recharging the sorption material is accomplished by removal of the cartridge with the at least partially sorbed sorption material from the cartridge receiver, and then positioning a cartridge with at least substantially desorbed sorption material in the cartridge receiver.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

What is claimed is:

1. A sorption system, comprising:
  an evaporator structured to contain a working fluid, and operable to evaporate the working fluid to produce a working fluid gas in the evaporator;
  a sorber structured to contain a sorption material to sorb the working fluid gas during a sorption phase;
  a flow channel extending between the evaporator and the sorber to provide a gas pathway connecting the evaporator and the sorber;
  a vapor control valve positioned to control the rate of vapor flow between the evaporator and the sorber through a flow channel, and being selectively operable to permit the flow of working fluid gas through the flow channel, to next stop the flow of working fluid gas through the flow channel, and after stopping the flow to then permit resumption of the flow of working fluid gas through the flow channel; and
  a plunger operable to control the rate of vapor flow between the evaporator and the sorber through the flow channel; and
  a vacuum barrier material positioned about the sorber, evaporator, and flow channel to provide a reduced pressure therewithin to promote evaporation of the working fluid at a reduced temperature compared to the temperature required at ambient pressure, the vacuum barrier material being a flexible material; and
  a temperature controller to adjust the position of the plunger to control the rate of vapor flow through the vapor control valve.

2. The sorption system of claim 1, wherein the vapor control valve has a contact surface and the temperature controller has a contact surface, the contact surface of the temperature controller being removably dockable to the contact surface of the vapor control valve.

3. The sorption system of claim 1, where the vacuum barrier material includes first, second, and third flexible material portions, the third flexible material portion having a first end portion and a second end portion, the first end portion being in sealed engagement with the first flexible material portion and the second end portion being in sealed engagement with the second flexible material portion to define an internal barrier, the third flexible material portion being positioned to create a stable sealing surface, the plunger protruding through the third flexible material portion, but not through the first flexible material portion or through the second flexible material portion, the plunger being located proximal to the sealing surface, and the plunger being movable toward the sealing surface by atmospheric pressure.

4. The sorption system of claim 3, further including a temperature sensor positioned to measure the temperature of one of the evaporator surface and the air adjacent to the evaporator surface indicative of an evaporator surface temperature, and generate a temperature signal; and wherein the temperature controller includes:
  an inflatable member having a first inflation state and a second inflation state; and
  a control unit configured to evaluate the temperature signal and in response control the state of inflation of the inflatable member and thereby the operation of the vapor control valve to control the rate of gas flow between the evaporator and sorber through the gas pathway, when the inflatable member is in the first inflation state, the inflatable member causes opening of the vapor control valve to increase the rate of gas flow in the flow channel between the evaporator and the sorber through the gas pathway, and when the inflatable member is in the second inflation state, the inflatable member permits closing of the valve to reduce the rate of gas flow in the flow channel between the evaporator and the sorber through the gas pathway.

5. The sorption system of claim 1, further including a temperature sensor positioned to measure the temperature of one of the evaporator surface and the air adjacent to the evaporator surface indicative of an evaporator surface temperature, and generate a temperature signal; and wherein the temperature controller includes:
  an inflatable member having a first inflation state and a second inflation state; and a control unit configured to evaluate the temperature signal and in response control the state of inflation of the inflatable member and thereby the operation of the vapor control valve to control the rate of gas flow between the evaporator and sorber through the gas pathway, when the inflatable member is in the first inflation state, the inflatable member causes opening of the vapor control valve to increase the rate of gas flow in the flow channel between the evaporator and the sorber through the gas pathway, and when the inflatable member is in the second inflation state, the inflatable member permits closing of the vapor control valve to reduce the rate of gas flow in the flow channel between the evaporator and the sorber through the gas pathway.

6. The sorption system of claim 5, wherein the control unit includes a microcontroller operatively connected to the temperature sensor and configured to read the temperature signal of the temperature sensor, and if the temperature signal indicates an evaporator surface temperature above a stored temperature setpoint, the microcontroller changes the inflatable member from the second inflation state to the first inflation state.

7. The sorption system of claim 5, wherein the control unit includes an electronic circuit operatively connected to the temperature sensor and configured to read the temperature signal of the temperature sensor, and if the temperature signal indicates an evaporator surface temperature above a stored temperature setpoint, the electronic circuit changes the inflatable member from the second inflation state to the first inflation state.

8. The sorption system of claim 5, further including an air compressor, wherein the control unit includes an electronic circuit operatively connected to the temperature sensor and the air compressor, the electronic circuit configured to read the temperature signal of the temperature sensor, and if the temperature signal indicates an evaporator surface temperature above a stored temperature setpoint, the electronic circuit turns on the air compressor to inflate the inflatable member to change the inflation member from the second inflation state to the first inflation state.

9. The sorption system of claim 5, wherein the control unit compares the temperature measured by the temperature sensor with a stored temperature setpoint and inflates the inflatable member if the measured temperature is above the stored temperature setpoint.

10. The sorption system of claim 5, further including at least one battery for powering the temperature controller and a display, and wherein the control unit indicates the state of the at least one battery using the display.

11. The sorption system of claim 5, further including an electrical heating circuit, and wherein the control unit activates the electrical heating circuit when the temperature measured by the temperature sensor falls below a preselected temperature.

12. The sorption system of claim 5, further including a memory, and wherein the control unit stores in the memory the data measured by the temperature sensor during operation.

13. The sorption system of claim 5, further including a payload compartment, and wherein the control unit controls the state of inflation of the inflatable member to regulate the evaporation temperature in the evaporator to maintain the temperature measured by the temperature sensor at plus or minus 1 degree Kelvin of a preselected temperature.

14. The sorption system of claim 5, further including a pressure plate, and wherein the vapor control valve has a plunger which is movable to open the vapor control valve, the pressure plate being located between the inflation member and the plunger, and when the inflation member is inflated to the first inflation state, the inflation member is in operable engagement with the pressure plate and applies a force through the pressure plate to the plunger sufficient to cause the plunger to open the vapor control valve.

15. The sorption system of claim 5 wherein the pressure plate is a rigid plate.

16. The sorption system of claim 5, wherein when the temperature measured by the temperature sensor exceeds a first stored temperature setpoint, the control unit causes inflation of the inflatable member to the first inflation state to open the vapor control valve, and when the temperature measured by the temperature sensor is below a second stored temperature setpoint, the control unit causes deflation of the inflatable member to the second inflation state to close the vapor control valve.

17. The sorption system of claim 5, wherein the temperature sensor forms a portion of the temperature controller.

18. The sorption system of claim 5, wherein the temperature sensor does not form a portion of the temperature controller.

19. The sorption system of claim 5, wherein the temperature controller is removably dockable to the vapor control valve.

20. The sorption system of claim 19, wherein the temperature controller includes a plurality of contact surfaces for removably docking the temperature controller to the vapor control valve.

21. The sorption system of claim 5, further including an air compressor, wherein the control unit includes a microcontroller operatively connected to the temperature sensor and the air compressor, the microcontroller configured to read the temperature signal of the temperature sensor, and if the temperature signal indicates an evaporator surface temperature above a stored temperature setpoint, the microcontroller turns on the air compressor to inflate the inflatable member to change the inflation member from the second inflation state to the first inflation state.

22. The sorption system of claim 21, wherein the microcontroller is operatively connected to a memory, and the stored temperature setpoint is stored in the memory.

23. The sorption system of claim 21, wherein the microcontroller is mounted on an electronic circuit board.

24. The sorption system of claim 5, further including an air compressor, an air outlet valve and pneumatic conduits connecting the inflatable member with the air compressor for inflation of the inflatable member and with the air outlet valve for deflation of the inflatable member.

25. The sorption system of claim 24, wherein the air outlet valve is configured to have a biasing force applied thereto biasing the valve toward a closed state, and the air outlet valve is movable to an open state to deflate the inflatable member, and when in the open state, at least a portion of the biasing force applied to the valve is transmitted to the inflatable member to facilitate changing the inflatable member from the first inflation state to the second inflation state.

26. The sorption system of claim 24, wherein the air outlet valve is manually operable to manually exhaust air from the inflatable member.

27. The sorption system of claim 24, further including a pressure sensor positioned to measure the air pressure in at least one of the pneumatic conduits and generate a pressure signal, and wherein the control unit includes a microcontroller operatively connected to the pressure sensor and configured to read the pressure signal of the pressure sensor, and when the air compressor is inflating the inflatable member, if the pressure signal indicates the pressure in the at least one pneumatic conduit reaches a first stored pressure setpoint the microcontroller terminates inflation of the inflatable member by the air compressor, and when the air outlet valve is deflating the inflatable member, if the pressure signal indicates a pressure in the at least one pneumatic conduit reaches a second stored pressure setpoint the microcontroller terminates deflation of the inflatable member by the air outlet valve.

28. The sorption system of claim 24, further including a pressure sensor operatively connected to the control unit, the pressure sensor measuring the air pressure in at least one of the pneumatic conduits.

29. The sorption system of claim 28, wherein at least one of the air compressor and the air outlet valve is in operation until the pressure sensor measures a stored pressure setpoint.

30. The sorption system of claim 5, wherein when the temperature measured by the temperature sensor exceeds a stored temperature setpoint, the control unit causes inflation of the inflatable member to the first inflation state to open the vapor control valve, and when the temperature measured by the temperature sensor is below the stored temperature setpoint, the control unit causes deflation of the inflatable member to the second inflation state to close the vapor control valve.

31. The sorption system of claim 30, wherein the control unit has a memory within which the stored temperature setpoint is stored.

32. A sorption system for use with a temperature controller, comprising:
  an evaporator structured to contain a working fluid, and operable to evaporate the working fluid to produce a working fluid gas in the evaporator;
  a sorber structured to contain a sorption material to sorb the working fluid gas during a sorption phase;
  a flow channel extending between the evaporator and the sorber to provide a gas pathway connecting the evaporator and the sorber;
  a vapor control valve positioned to control the rate of vapor flow between the evaporator and the sorber through a flow channel, and being selectively operable to permit the flow of working fluid gas through the flow channel, to next stop the flow of working fluid gas through the flow channel, and after stopping the flow to then permit resumption of the flow of working fluid gas through the flow channel; and
  a plunger operable to control the rate of vapor flow between the evaporator and the sorber through the flow channel; and
  a vacuum barrier material positioned about the sorber, evaporator, and flow channel to provide a reduced pressure therewithin to promote evaporation of the working fluid at a reduced temperature compared to the temperature required at ambient pressure, the vacuum barrier material being a flexible material; and
  a contact surface removably dockable with the temperature controller to dock the temperature controller to the vapor control valve such that the position of the plunger may be adjusted by the temperature controller to control the rate of vapor flow through the vapor control valve.

33. The sorption system of claim 32, where the vacuum barrier material includes first, second, and third flexible material portions, the third flexible material portion having a first end portion and a second end portion, the first end portion being in sealed engagement with the first flexible material portion and the second end portion being in sealed engagement with the second flexible material portion to define an internal barrier, the third flexible material portion being positioned to create a stable sealing surface, the plunger protruding through the third flexible material portion, but not through the first flexible material portion or through the second flexible material portion, the plunger being located proximal to the sealing surface, and the plunger being movable toward the sealing surface by atmospheric pressure.

34. A sorption system, comprising:
  an evaporator structured to contain a working fluid, and operable to evaporate the working fluid to produce a working fluid gas in the evaporator;
  a sorber structured to contain a sorption material to sorb the working fluid gas during a sorption phase;
  a flow channel extending between the evaporator and the sorber to provide a gas pathway connecting the evaporator and the sorber;
  a vapor control valve positioned to control the rate of vapor flow between the evaporator and the sorber through a flow channel, and being selectively operable to permit the flow of working fluid gas through the flow channel, to next stop the flow of working fluid gas through the flow channel, and after stopping the flow to then permit resumption of the flow of working fluid gas through the flow channel;
  a plunger operable to control the rate of vapor flow between the evaporator and the sorber through the flow channel, wherein the position of the plunger is temperature dependent; and
  a vacuum barrier material positioned about the sorber, evaporator, and flow channel to provide a reduced pressure therewithin to promote evaporation of the working fluid at a reduced temperature compared to the temperature required at ambient pressure, the vacuum barrier material being a flexible material.

35. The sorption system of claim 34, where the vacuum barrier material includes first, second, and third flexible material portions, the third flexible material portion having a first end portion and a second end portion, the first end portion being in sealed engagement with the first flexible material portion and the second end portion being in sealed engagement with the second flexible material portion to define an internal barrier, the third flexible material portion being positioned to create a stable sealing surface, the plunger protruding through the third flexible material portion, but not through the first flexible material portion or through the second flexible material portion, the plunger being located proximal to the sealing surface, and the plunger being movable toward the sealing surface by atmospheric pressure.

36. The sorption system of claim 35, further including:
  a temperature sensor positioned to measure the temperature of one of the evaporator surface and the air adjacent to the evaporator surface indicative of an evaporator surface temperature, and generate a temperature signal; and
  an inflatable member having a first inflation state and a second inflation state dependent on the temperature signal to control the rate of gas flow between the evaporator and sorber through the gas pathway, when the inflatable member is in the first inflation state, the inflatable member causes opening of the vapor control valve to increase the rate of gas flow in the flow channel between the evaporator and the sorber through the gas pathway, and when the inflatable member is in the second inflation state, the inflatable member permits closing of the vapor control valve to reduce the rate of gas flow in the flow channel between the evaporator and the sorber through the gas pathway.

37. The sorption system of claim 34, further including:
a temperature sensor positioned to measure the temperature of one of the evaporator surface and the air adjacent to the evaporator surface indicative of an evaporator surface temperature, and generate a temperature signal; and
an inflatable member having a first inflation state and a second inflation state dependent on the temperature signal to control the rate of gas flow between the evaporator and sorber through the gas pathway, when the inflatable member is in the first inflation state, the inflatable member causes opening of the vapor control valve to increase the rate of gas flow in the flow channel between the evaporator and the sorber through the gas pathway, and when the inflatable member is in the second inflation state, the inflatable member permits closing of the vapor control valve to reduce the rate of gas flow in the flow channel between the evaporator and the sorber through the gas pathway.

38. The sorption system of claim 37, further including:
an air compressor; and
an electronic circuit operatively connected to the temperature sensor and the air compressor, the electronic circuit configured to read the temperature signal of the temperature sensor, and if the temperature signal indicates an evaporator surface temperature above a stored temperature setpoint, the electronic circuit turns on the air compressor to inflate the inflatable member to change the inflation member from the second inflation state to the first inflation state.

39. The sorption system of claim 37, further including:
an electrical heating circuit that is activated when the temperature measured by the temperature sensor falls below a preselected temperature.

40. The sorption system of claim 37, wherein the temperature sensor and inflatable member are selectively disconnectable from the vapor control valve.

\* \* \* \* \*